(12) United States Patent
Shavlik et al.

(10) Patent No.: US 9,092,201 B2
(45) Date of Patent: Jul. 28, 2015

(54) PLATFORM FOR DEVELOPMENT AND DEPLOYMENT OF SYSTEM ADMINISTRATION SOLUTIONS

(71) Applicant: Crimson Corporation, Dover, DE (US)

(72) Inventors: Mark Shavlik, White Bear Lake, MN (US); John G. Morgan, Bloomington, MN (US); Rob Juncker, Farmington, MN (US)

(73) Assignee: Crimson Corporation, Dover, DE (US)

( * ) Notice: Subject to any disclaimer, the term of this patent is extended or adjusted under 35 U.S.C. 154(b) by 66 days.

(21) Appl. No.: 13/854,286

(22) Filed: Apr. 1, 2013

(65) Prior Publication Data

US 2014/0013300 A1 Jan. 9, 2014

Related U.S. Application Data

(63) Continuation of application No. 12/870,322, filed on Aug. 27, 2010, now Pat. No. 8,412,797.

(60) Provisional application No. 61/237,569, filed on Aug. 27, 2009.

(51) Int. Cl.
*G06F 9/44* (2006.01)
*G06F 9/445* (2006.01)

(52) U.S. Cl.
CPC .. *G06F 8/20* (2013.01); *G06F 8/65* (2013.01); *G06F 8/60* (2013.01)

(58) Field of Classification Search
None
See application file for complete search history.

(56) References Cited

U.S. PATENT DOCUMENTS

| 6,308,182 | B1 * | 10/2001 | Nishigaya et al. | 717/120 |
| 6,601,233 | B1 * | 7/2003 | Underwood | 717/104 |
| 6,871,346 | B1 * | 3/2005 | Kumbalimutt et al. | 717/120 |
| 6,964,034 | B1 * | 11/2005 | Snow | 717/121 |
| 7,240,325 | B2 * | 7/2007 | Keller | 717/121 |
| 7,613,804 | B2 * | 11/2009 | Raden et al. | 717/121 |
| 7,934,191 | B2 * | 4/2011 | Yassin | 717/104 |
| 7,975,031 | B2 * | 7/2011 | Bhattacharya et al. | 709/221 |
| 8,015,546 | B2 * | 9/2011 | Jones et al. | 717/109 |

(Continued)

OTHER PUBLICATIONS

Reprise Software, "Pricing Strategies for Sublicensed Software Development Toolkits"; 2008, Resprise Software Inc.; [retrieved on Aug. 30, 2014]; Retrieved from Internet <URL:http://www.reprisesoftware.com/blog/2008/11/pricing-strategies-for-sublicensed-software-development-toolkits/>;pp. 1-3.*

(Continued)

*Primary Examiner* — Xi D Chen
(74) *Attorney, Agent, or Firm* — Austin Rapp & Hardman

(57) ABSTRACT

General-purpose components are selectively included in a toolkit hosted by hosting provider computing devices. The general-purpose components are software components. The general-purpose components in the toolkit are available over a computer network to end user computing devices. The end user computing devices utilizes general-purpose components in the toolkit to provide system administration solutions. The system administration solutions are web applications hosted by the hosting provider computing devices. The system administration solutions provide an ability to perform administration tasks on on-premises computer systems of the end users. A hosting provider computing device is configured such that the end user computing devices are able to utilize the general-purpose components in the toolkit on a Software-as-a-Service (SaaS) basis.

32 Claims, 20 Drawing Sheets

(56) References Cited

U.S. PATENT DOCUMENTS

| | | | |
|---|---|---|---|
| 8,108,825 B2* | 1/2012 | Goodwin et al. | 717/104 |
| 8,117,596 B2* | 2/2012 | Thorley et al. | 717/122 |
| 8,312,415 B2* | 11/2012 | Marius et al. | 717/101 |
| 8,341,595 B2* | 12/2012 | Arner et al. | 717/104 |
| 8,356,274 B2* | 1/2013 | Kwok et al. | 717/104 |
| 8,370,906 B2* | 2/2013 | Wen et al. | 717/121 |
| 8,412,797 B2* | 4/2013 | Shavlik et al. | 709/217 |
| 8,769,522 B2* | 7/2014 | Venkatraman et al. | 717/173 |
| 8,813,063 B2* | 8/2014 | Uthe | 717/174 |
| 8,825,750 B2* | 9/2014 | Shimamoto | 717/120 |
| 8,856,737 B2* | 10/2014 | Kand et al. | 717/120 |
| 8,869,099 B2* | 10/2014 | Kothari et al. | 717/104 |
| 8,869,108 B2* | 10/2014 | Utschig-Utschig et al. | 717/120 |
| 8,904,343 B2* | 12/2014 | Balko et al. | 717/104 |
| 2004/0181471 A1* | 9/2004 | Rogers | 705/31 |
| 2005/0257214 A1* | 11/2005 | Moshir et al. | 717/171 |
| 2006/0037000 A1* | 2/2006 | Speeter et al. | 717/120 |
| 2006/0064574 A1* | 3/2006 | Rolfs | 713/1 |
| 2006/0242655 A1* | 10/2006 | Fernando et al. | 719/332 |
| 2007/0226227 A1 | 9/2007 | Helfman | |
| 2007/0226259 A1* | 9/2007 | Kacin et al. | 707/104.1 |
| 2007/0271557 A1* | 11/2007 | Geisinger | 717/163 |
| 2007/0283324 A1* | 12/2007 | Geisinger | 717/120 |
| 2008/0028401 A1* | 1/2008 | Geisinger | 718/1 |
| 2008/0120598 A1* | 5/2008 | Imeshev | 717/104 |
| 2008/0155350 A1* | 6/2008 | Ivanov et al. | 714/45 |
| 2008/0313594 A1* | 12/2008 | Smith | 717/100 |
| 2008/0313596 A1* | 12/2008 | Kreamer et al. | 717/101 |
| 2008/0320436 A1* | 12/2008 | Hughes | 717/100 |
| 2009/0037875 A1* | 2/2009 | Jones et al. | 717/109 |
| 2009/0077229 A1* | 3/2009 | Ebbs | 709/224 |
| 2009/0248173 A1* | 10/2009 | Sasko et al. | 700/9 |
| 2010/0031079 A1 | 2/2010 | Gupta et al. | |
| 2010/0281173 A1* | 11/2010 | Vutukuri et al. | 709/228 |
| 2011/0093366 A1* | 4/2011 | Nuggehalli et al. | 717/120 |
| 2011/0145789 A1* | 6/2011 | Rasch et al. | 717/121 |
| 2011/0251992 A1 | 10/2011 | Bethlehem et al. | |
| 2011/0313966 A1* | 12/2011 | Schmidt et al. | 706/52 |
| 2012/0185821 A1* | 7/2012 | Yaseen et al. | 717/104 |
| 2013/0332899 A1* | 12/2013 | Stewart et al. | 717/121 |
| 2014/0040861 A1* | 2/2014 | Kim et al. | 717/120 |
| 2014/0040862 A1* | 2/2014 | Webster et al. | 717/121 |
| 2014/0068546 A1* | 3/2014 | Balasubramanian et al. | 717/104 |
| 2014/0075031 A1* | 3/2014 | Doering et al. | 709/226 |
| 2014/0075412 A1* | 3/2014 | Kannan et al. | 717/120 |
| 2014/0258983 A1* | 9/2014 | Inamdar et al. | 717/121 |
| 2014/0372980 A1* | 12/2014 | Verma et al. | 717/121 |

OTHER PUBLICATIONS

Zhang, et al., "Cloud Computing Research and Development Trend", 2010 IEEE; [retrieved on Feb. 8, 2015]; Retrieved from Intrnet <URL:http://ieeexplore.ieee.org/stamp/stamp.jsp?tp=&arnumber=5431874>; pp. 93-97.*

Hildmann, Kao, "Deploying and extending on-premise cloud storage based on ownCloud"; 2014 IEEE; [retrieved on Feb. 8, 2015]; Retrieved from Intrnet <URL:http://ieeexplore.ieee.org/stamp/stamp.jsp?tp=&arnumber=6888843>; pp. 76-81.*

Dreher, Vouk, "Integration of High-Performance Computing into a VCL Cloud"; 2013 ACM; [retrieved on Feb. 8, 2015]; Retrieved from Intrnet <URL:http://dl.acm.org/citation.cfm?id=2535800.2535802>; pp. 1-6.*

Weissman, Bobrowski, "The Design of the Force.com Multitenant Internet Application Development Platform", 2009 ACM; [retrieved on Feb. 8, 2015]; Retrieved from Intrnet <URL:http://dl.acm.org/citation.cfm?id=1559845.1559942>; pp. 889-896.*

Litty, et al., "Patch Auditing in Infrastructure as a Service Clouds", 2011 ACM; [retrieved on Jun. 1, 2015]; Retrieved from Internet<URL:http://dl.acm.org/citation.cfm?id=1952682.1952702>;pp145-155.*

Nair, Gopalakrishna, "CloudCop: Putting Network-Admin on Cloud Nine", 2009 IEEE; Jun. 1, 2015; Retrieved from Internet<Url:http://ieeexplore.ieee.org/stamp/stamp.jsp?tp=&arnumber=5439474>; pp1-6.*

* cited by examiner

| Identifier | License | Version | Edition | Name | Software | ••• |
|---|---|---|---|---|---|---|
| | | | | | | |
| | | | | | | |
| | | | | | | |
| | | | | | | |
| | | | ••• | | | |
| | | | | | | |

FIG. 14

DISCOVERED SOFTWARE

| Display Name | Publisher | Version |
|---|---|---|
| Apex API 10.8 V8 Samples | Example Publisher 1 | 10.0.0 |
| Application Support | Example Publisher 2 | 3.1 |
| Developer studio 8 | Example Publisher 3 | 8.3 |

MISSING SECURITY PATCHES

| QNumber | Bulletin ID | Bulletin Title | Name | Category | Comment | Date |
|---|---|---|---|---|---|---|
| Q982312 | MS10-036 | Vulnerability in COM ... | ExampleCo Office 2007 | ExampleCo Office | | 6/9/10 |
| QFF3680 | FF10-014 | Browser 3.6.8 | Browser 3.6.7 | Example Browser 1 | | 7/23/10 |
| QAA5006 | AA501-006 | Application support 1.3.0 | Browser 5.0 | Example Browser 2 | Please remember to... | 6/8/10 |

PLATFORM FOR DEVELOPMENT AND DEPLOYMENT OF SYSTEM ADMINISTRATION SOLUTIONS

CROSS-REFERENCE TO RELATED APPLICATION(S)

This application is a continuation of U.S. patent application Ser. No. 12/870,322, filed Aug. 27, 2010 and entitled "PLATFORM FOR DEVELOPMENT AND DEPLOYMENT OF SYSTEM ADMINISTRATION SOLUTIONS", which in turn claims benefit of U.S. Provisional Application No. 61/237,569, filed Aug. 27, 2009, the contents of which are incorporated herein in their entirety by reference.

BACKGROUND

End users frequently use complex on-premises computer systems. For example, an entity, such as a corporation or government agency, may use a computer network system to facilitate communication among computers used by its employees. In another example, an entity may use a virtualization system to support one or more applications. For example, a virtualization system manages a plurality of virtual machines operating on a single set of hardware.

Because such computer systems can be complex to set up and maintain, system administration solutions are needed to administer the computer systems. For example, a system administration solution may be needed to identify and diagnose problems in a corporation's computer network. System administration solutions can be complex and expensive to design and implement. A significant portion of the complexity and expense associated with designing and implementing system administration solutions is attributable to a lack of the ability to reuse previously implemented components. Furthermore, system administration solutions can be expensive to maintain because each of the end users may need to develop updates to the components of the system administration solutions.

SUMMARY

In one aspect of this patent document, general-purpose components are selectively added to a toolkit hosted by hosting provider computing devices. The general-purpose components are software components. The general-purpose components in the toolkit are available over a computer network to end user computing devices. The end user computing devices utilizes the general-purpose components in the toolkit to provide system administration solutions. The system administration solutions are web applications hosted by the hosting provider computing devices. The system administration solutions provide an ability to perform administration tasks on on-premises computer systems. A hosting provider computing device is configured such that the end user computing devices are able to utilize the general-purpose components in the toolkit on a Software-as-a-Service (SaaS) basis.

Another example aspect is a method for developing a system administration solution. The method comprises accessing one or more web pages in a toolkit website. The one or more web pages in the toolkit website include descriptions of general-purpose components in a toolkit. The general-purpose components are available over a computer network on a Software-as-a-Service (SaaS) basis. The method also comprises identifying needed general-purpose components from among the general-purpose components in the toolkit. The needed general-purpose components are needed by the software developer to develop a system administration solution for an end user. The end user has an on-premises computer system. The system administration solution is a web application that enables the end user to perform an administration task on the on-premises computer system. Furthermore, the method comprises using the computing device to develop special-purpose components. The special-purpose components are by the software developer to develop the system administration solution but not among the general-purpose components. In addition, the method comprises storing the special-purpose components at a hosting provider computing device. The hosting provider computing device also hosts the general-purpose components. The method also comprises deploying the system administration solution.

Yet another example is a method for administering a computer system. The method comprises retrieving, by an end user computing device operated by an end user, a web page in a system administration solution hosted by a hosting provider computing device. The system administration solution is a web application for performing an administration task on an on-premises computer system of the end user. A toolkit including general-purpose components available for use on a Software-as-a-Service (SaaS) basis. The system administration solution including at least one of the general-purpose components in the toolkit. The method also comprises causing, by the end user computing device, a display device to display the web page. In addition, the method comprises receiving, by the end user computing device, component selection input indicating a feature of the web page selected by the end user. The feature is associated with a target component of the system administration solution. The target component needs local administrator privileges at the end user computing device to operate properly. Furthermore, in response to receiving the component selection input, the method comprises determining, by the end user computing device, whether an agent is operational at the end user computing device. The agent is a software process having local administrator privileges. The agent is one of the general-purpose components in the toolkit. In addition, the method comprises in response to determining that the agent is not operational at the end user computing device: retrieving, by the end user computing device, data representing the agent from the hosting provider computing device; and starting the agent at the end user computing device. In addition, the method comprises receiving, at the end user computing device, data representing the target component. Furthermore, the method comprises running, by the end user computing device, the target component in the agent.

In yet another aspect is a computing device comprising a processing unit and a memory. The memory storing software instructions that, when executed by the processing unit, cause the computing device to retrieve a web page in a system administration solution hosted by a hosting provider computing device. The system administration solution is a web application for performing an administration task on an on-premises computer system. A toolkit including general-purpose components that are available for use on a Software-as-a-Service basis. The system administration solution including at least one of the general-purpose components in the toolkit. The software instructions also cause the computing device to cause a display device to display the web page. In addition, the software instructions also cause the computing device to receive component selection input indicating a feature of the web page selected by a user of the computing device. The feature is associated with a target component of the system administration solution. The target component needs local administrator privileges at the computing device to operate properly. Furthermore, in response to receiving the component selection input, the software instructions also cause the computing device to determine whether an agent is operational at the computing device. The agent is a software process having local administrator privileges. The agent is one of the general-purpose components in the toolkit. In response to determining that the agent is not operational at the computing device, the software instructions also cause the computing device to retrieve data representing the agent from the hosting provider computing device and to start the agent. The software instructions also cause the computing device to receive data representing the target component and run the target component in the agent.

BRIEF DESCRIPTION OF THE DRAWINGS

FIG. 14 illustrates an example database table for storing data regarding components in the toolkit.

FIG. 19 illustrates a browser window and a webpage that is displayed by the web browser application.

DETAILED DESCRIPTION

Figure 1:
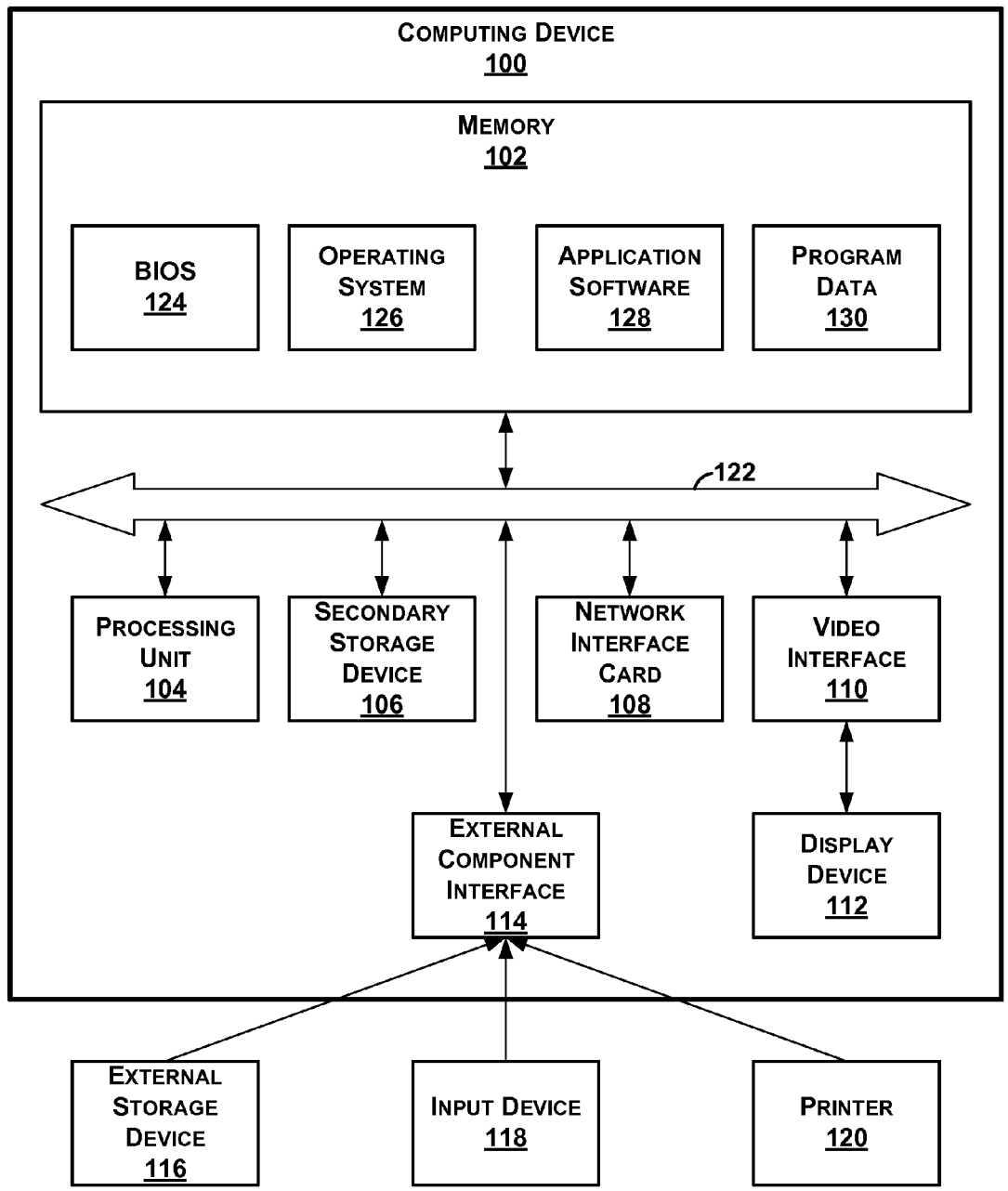
FIG. 1 is a block diagram illustrating example hardware components of a computing device.

As briefly described above, this patent document describes a platform for development and deployment of system administration solutions. The embodiments are described with reference to the figures. Reference numerals in this patent document refer to like parts and assemblies throughout the figures. This specification and the appended figures are provided only for purposes of explanation. The specification and drawings are not meant to illustrate exclusive embodiments or otherwise limit the scope of the claims.

FIG. 1 is a block diagram illustrating example hardware components of a computing device 100. In different embodiments, computing devices are implemented in different ways. In the example of FIG. 1, the computing device 100 comprises a memory 102, a processing unit 104, a secondary storage device 106, a network interface card 108, a video interface 110, a display device 112, an external component interface 114, an external storage device 116, an input device 118, a printer 120, and a communication medium 122. In other embodiments, computing devices are implemented using more or fewer hardware components. In another example embodiment, a computing device does not include a video interface, a display device, an external storage device, or an input device.

The memory 102 includes one or more computer-readable data storage media capable of storing data and/or instructions. In different embodiments, the memory 102 is implemented in different ways. For example, in various embodiments, the memory 102 is implemented using various types of computer-readable data storage media. Example types of computer-readable data storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data.

The processing unit 104 includes one or more physical integrated circuits that selectively execute software instructions. In various embodiments, the processing unit 104 can be implemented in various ways. In one example, the processing unit 104 can be implemented as one or more processing cores. For example, the processing unit 104 can be implemented as one or more Intel Core 2 microprocessors. In another example, the processing unit 104 is implemented as one or more separate microprocessors. In yet another example, the processing unit 104 is implemented as an ASIC that provides specific functionality. In yet another example, the processing unit 104 provides specific functionality by using one or more ASICs and by executing software instructions.

In different embodiments, the processing unit 104 executes software instructions in different instruction sets. For example, in various embodiments the processing unit 104 executes software instructions in instruction sets such as the x86 instruction set, the POWER instruction set, a RISC instruction set, the SPARC instruction set, the IA-64 instruction set, the MIPS instruction set, and/or other instruction sets.

The secondary storage device 106 includes one or more computer-readable data storage media. The secondary storage device 106 stores data and software instructions not directly accessible by the processing unit 104. In other words, the processing unit 104 performs an I/O operation to retrieve data and/or software instructions from the secondary storage device 106. In various embodiments, the secondary storage device 106 can include various types of computer-readable data storage media. For example, the secondary storage device 106 may be implemented by one or more magnetic disks, magnetic tape drives, CD-ROM discs, DVD-ROM discs, Blu-Ray discs, solid state memory devices, Bernoulli cartridges, and/or other types of computer-readable data storage media.

The network interface card 108 enables the computing device 100 to send data to and receive data from a computer communication network. In different embodiments, the network interface card 108 is implemented in different ways. For example, in various embodiments, the network interface card 108 is implemented as an Ethernet interface, a token-ring network interface, a fiber optic network interface, a wireless network interface (e.g., Wi-Fi, WiMax, etc.), or another type of network interface.

The video interface 110 enables the computing device 100 to output video information to the display device 112. In different embodiments, the video interface 110 is implemented in different ways. In one example, the video interface 110 is integrated into a motherboard of the computing device 100. In another example, the video interface 110 is a video expansion card.

In various embodiments, the display device 112 is implemented as various types of display devices. Example types of display devices include, but are not limited to, cathode-ray tube displays, LCD display panels, plasma screen display panels, touch-sensitive display panels, LED screens, projectors, and other types of display devices. In various embodiments, the video interface 110 communicates with the display device 112 in various ways. For example, in various embodiments the video interface 110 communicates with the display device 112 via a Universal Serial Bus (USB) connector, a VGA connector, a digital visual interface (DVI) connector, an S-Video connector, a High-Definition Multimedia Interface (HDMI) interface, a DisplayPort connector, or other types of connectors.

The external component interface 114 enables the computing device 100 to communicate with external devices. In various embodiments, the external component interface 114 is implemented in different ways. In one example, the external component interface 114 is a USB interface. In other examples, the computing device 100 is a FireWire interface, a serial port interface, a parallel port interface, a PS/2 interface, and/or another type of interface that enables the computing device 100 to communicate with external components.

The external component interface 114 enables the computing device 100 to communicate with various types of external components. In the example of FIG. 1, the external component interface 114 enables the computing device 100 to communicate with the external storage device 116, the input device 118, and the printer 120. In other examples, the external component interface 114 enables the computing device 100 to communicate with more or fewer external components. Other example types of external components include, but are not limited to, speakers, phone charging jacks, modems, media player docks, other computing devices, scanners, digital cameras, a fingerprint reader, and other devices that can be connected to the computing device 100.

The external storage device 116 is an external component comprising one or more computer readable data storage media. Different implementations of the computing device 100 interface with different types of external storage devices. Example types of external storage devices include, but are not limited to, magnetic tape drives, flash memory modules, magnetic disk drives, optical disc drives, flash memory units, zip disk drives, optical jukeboxes, and other types of devices comprising one or more computer-readable data storage media. The input device 118 is an external component that provides user input to the computing device 100. Different implementations of the computing device 100 interface with different types of input devices. Example types of input devices include, but are not limited to, keyboards, mice, trackballs, stylus input devices, key pads, microphones, joysticks, touch-sensitive display screens, and other types of devices that provide user input to the computing device 100. The printer 120 is an external device that prints data to paper. Different implementations of the computing device 100 interface with different types of printers. Example types of printers include, but are not limited to laser printers, ink jet printers, photo printers, copy machines, fax machines, receipt printers, dot matrix printers, or other types of devices that print data to paper.

The communications medium 122 facilitates communication among the hardware components of the computing device 100. In different embodiments, the communications medium 122 facilitates communication among different components of the computing device 100. In the example of FIG. 1, the communications medium 122 facilitates communication among the memory 102, the processing unit 104, the secondary storage device 106, the network interface card 108, the video interface 110, and the external component interface 114. In different implementations of the computing device 100, the communications medium 122 is implemented in different ways. For example, the communications medium 122 can be implemented as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

The memory 102 stores various types of data and/or software instructions. In the example of FIG. 1, the memory 102 stores a Basic Input/Output System (BIOS) 124, an operating system 126, application software 128, and program data 130. The BIOS 124 includes a set of software instructions that, when executed by the processing unit 104, cause the computing device 100 to boot up. The operating system 126 includes a set of software instructions that, when executed by the processing unit 104, cause the computing device 100 to provide an operating system that coordinates the activities and sharing of resources of the computing device 100. Example types of operating systems include, but are not limited to, Microsoft Windows, Linux, Unix, Apple OS X, Apple OS X iPhone, Palm webOS, Palm OS, Google Chrome OS, Google Android OS, and so on. The application software 128 includes a set of software instructions that, when executed by the processing unit 104, cause the computing device 100 to provide applications to a user of the computing device 100. The program data 130 is data generated and/or used by the application software 128.

Figure 2:
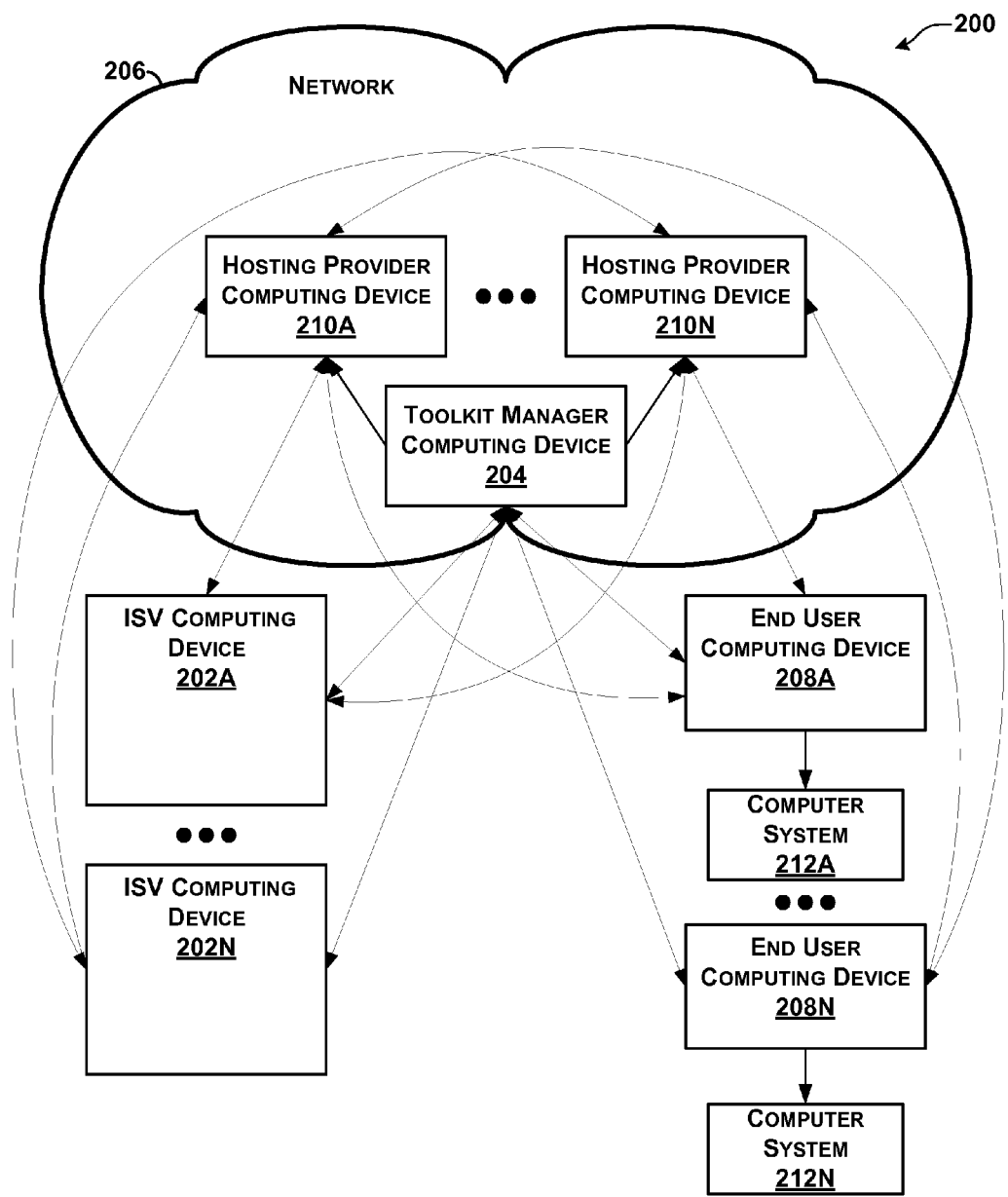
FIG. 2 is a block diagram illustrating an example platform for development of system administration solutions.

FIG. 2 is a block diagram illustrating an example platform 200 for development and deployment of system administration solutions. As described in detail in this patent document, the platform 200 includes a software and/or hardware architecture exhibiting functionality that supports development and operation of system administration solutions. Examples of such a platform include software executed by a single computing device, computing devices at a single location, computing devices at different locations communicating over a network, and the like.

As illustrated in the example of FIG. 2, the platform 200 includes independent software vendor (ISV) computing devices 202A-202N (collectively, "ISV computing devices 202") and end user computing devices 208A-208N (collectively, "end user computing devices 208"). In addition, the platform 200 includes a network 206. The platform 200 also includes a toolkit manager computing device 204 and hosting provider computing devices 210A-210N (collectively, "hosting provider computing devices 210"). Each of the end user computing devices 208 interacts with one of on-premise computer systems 212A-212N (collectively, "computer systems 212"). It should be appreciated that in other embodiments, other platforms for development and deployment of system administration solutions may include more or fewer components and/or participants.

Although only fourteen (A through N) hosting provider computing devices 210, ISV computing devices 202, end user computing devices 208, and on-premise computer systems 212 are illustrated in the example embodiment, other embodiments can use more or fewer of the hosting provider computing devices 210, the ISV computing devices 202, the end user computing devices 208, and the on-premise computer systems 212. Additionally, other embodiments could have different numbers for each of the hosting provider computing devices 210, ISV computing devices 202, end user computing devices 208, and on-premise computer systems 212. For example, a single end user computing device 208A could be in data communication with more than one of the on-premise computer system 212.

In some embodiments, the ISV computing devices 202, the toolkit manager computing device 204, the end user computing devices 208, and the hosting provider computing devices 210 are computing devices of the type illustrated in the example of FIG. 1. It should be appreciated that in other embodiments, the ISV computing devices 202, the toolkit manager computing device 204, the end user computing devices 208, and the hosting provider computing devices 210 are implemented using hardware components other than those illustrated in the example of FIG. 1. In some embodiments, functionality of the ISV computing devices 202, the toolkit manager computing device 204, the end user computing devices 208, and the hosting provider computing devices 210 described in this patent document result when processing units of the computing devices execute software instructions in application software.

The ISV computing devices 202 are operated by ISVs that develop system administration solutions. The ISVs employ software developers. In different embodiments, the ISVs may be different types of entities. For example, the ISVs may be business entities. Example types of business entities include, but are not limited to, corporations, partnerships, sole proprietorships, limited liability companies, limited liability partnerships, limited partnerships, and other types of entities organized for the purpose of carrying on business. In other examples, the ISVs may be governmental organizations, foundations, non-profit entities, estates, individuals, and other types of entities.

The toolkit manager computing device 204 is operated by a toolkit manager. The toolkit manager is an entity that manages the platform 200. The end user computing devices 208 are operated by end users. The end users also utilize on-premise computer systems 212. The hosting provider computing devices 210 are operated by hosting providers. The hosting providers are entities that provide hosting services on a Platform-as-a-Service (PaaS) basis. In different embodiments, the toolkit manager, the end users, and the hosting providers may be a variety of different types of entities. For example, the toolkit manager, the end users, and the hosting providers may be business entities, government entities, non-profit entities, individuals, and/or other types of entities.

The network 206 is a computer communication network that facilitates communication among the ISV computing devices 202, the toolkit manager computing device 204, the end user computing devices 208, and the hosting provider computing devices 210. The network 206 comprises a set of computing devices and a set of communication links. The communication links facilitate communication between the computing devices in the network 206. The network 206 may include a wide variety of different types of computing devices. For example, the network 206 can include switches, routers, hubs, bridges, firewalls, PBX devices, intrusion detection devices, proxy servers, relay devices, and other types of computing devices. In different embodiments, the network 206 is implemented at various scales. For example, the network 206 can be implemented as an internet, a wide area network, a local area network, a personal area network, or a network implemented on another scale. Various communications protocols are used in the network 206. Example communications protocols include Hypertext Transfer Protocol (HTTP), Transport Control Protocol (TCP), Session Initiation Protocol (SIP), Ethernet, User Datagram Protocol (UDP), and other types of communications protocols.

In the example of FIG. 2, the toolkit manager computing device 204 and the hosting provider computing devices 210 are illustrated within the network 206. The toolkit manager computing device 204 and the hosting provider computing devices 210 are illustrated within the network 206 to illustrate that services provided by the toolkit manager computing device 204 and the hosting provider computing devices 210 appear, from the perspective of the ISV computing devices 202 and the end user computing devices 208 to be provided from the network 206. In other words, the services of the toolkit manager computing device 204 and the hosting provider computing devices 210 are instances of cloud computing.

The end users have various types of on-premises computer systems 212. As used in this patent document, an end user has an on-premises computer system when physical infrastructure of the computer system is operated and maintained by the end user. In contrast, the physical infrastructure of an off-premises computer system maintained by a party other than the end user. For example, an off-premises computer system may be provided by "the cloud."

As part of managing the platform 200, the toolkit manager uses the toolkit manager computing device 204 to control which components are in a toolkit. In other words, the toolkit manager selectively adds components to the toolkit. The toolkit is a collection of components that can be used to develop system administration solutions. Components are predefined sets of code that, when interpreted or executed by computing devices, cause the computing devices to perform particular well-defined functionalities. Example types of components include scripts, compiled software, APIs, markup language documents, and other types of predefined sets of code that when interpreted or executed by computing devices, cause the computing devices to perform particular well-defined functionalities.

The ISVs interact with the ISV computing devices 202 to use components in the toolkit as components of system administration solutions built by the ISVs for the end users. The hosting provider computing devices 210 host the components in the toolkit and host the system administration solutions built by the ISVs. The end users use the end user computing devices 208 to interact with the hosting provider computing devices 210 to use the system administration solutions to perform administration tasks on the on-premises computer systems 212. Example administration tasks include generating inventories of hardware and software assets, deploying software patches, enforcing compliance of the on-premises computer systems 212 with security policies, installing software applications, determining utilizations levels, and the like.

To facilitate use of the components in the toolkit, the toolkit manager computing device 204 hosts a toolkit website. The toolkit website is accessible to the ISVs through web browser applications operating on the ISV computing devices 202. The toolkit website comprises web pages that provide descriptions of functionalities of components in the toolkit. For example, a web page in the toolkit website may include text indicating that a particular component monitors throughput of a router. In addition, the toolkit website comprises features that enable the ISVs to use the ISV computing devices 202 to access components in the toolkit. For example, a web page in the toolkit website can include a hyperlink to a component.

In some embodiments, descriptions in the toolkit website of functionalities of components in the toolkit are available in a plurality of languages. In this way, the toolkit website facilitates the use of the components in the toolkit by software developers who speak a variety of languages. In some circumstances, providing descriptions of the functionalities of components in different languages may be advantageous because the reuse of available components is frequently hindered by the fact that the components are described in languages not spoken by software developers who need the components.

Components in the toolkit include general-purpose components. General-purpose components are components that are not specific to a particular system administration solution. Rather, the ISVs can reuse general-purpose components in many different system administration solutions.

The general-purpose components in the toolkit may be implemented in a wide variety of ways. For example, one or more of the general-purpose components in the toolkit may be implemented as scripts. As used in this patent document, scripts include sets of commands for controlling one or more software applications. For example, JavaScript scripts are sets of commands frequently used for controlling web browser applications. In another example, PowerShell scripts are sets of commands for performing administrative tasks using the PowerShell command line interface of Microsoft® Windows™ operating systems. Scripts provided in the toolkit can be formatted in a variety of scripting languages. Example scripting languages include JavaScript, PowerShell, VBScript, Ruby on Rails, PHP, the JavaServer Pages (JSP) scripting language, JScript, PerlScript, AppleScript, Job Control Language (JCL), MS-DOS scripts, and other types of scripting languages.

In another example, one or more of the general-purpose components in the toolkit may be implemented as application programming interfaces (APIs). In some embodiments, the APIs operate on the hosting provider computing devices 210. In such embodiments, system administration solutions that utilize the APIs may use remote procedure calls to invoke methods of the APIs or to access properties of the APIs. In other embodiments, the APIs are downloaded to computing devices of users of the system administration solutions. In such other embodiments, the system administration solutions use local procedure calls to invoke methods of the APIs and are able to access properties of the APIs locally.

In some embodiments, general-purpose components in the toolkit interact with APIs in the toolkit. For example, a script in the toolkit could run at one of the end user computing devices 208 and read commands from an API in the toolkit, where the API is at one of the hosting provider computing devices 210.

In yet another example, one or more of the general-purpose components in the toolkit may be implemented as compiled application programs. As used in this disclosure, compiled applications include sets of software instructions compiled from a high-level programming language into a lower-level programming language, such as assembly code or an intermediate programming language.

In yet another example, one or more of the general-purpose components in the toolkit are user interface components. The user interface components include components that represent parts of user interfaces or otherwise control user interfaces. The user interface components may be formatted in a variety of ways. For example, one or more of the user interface components can be formatted according to the Hypertext Markup Language (HTML), the Extensible Markup Language (XML), or another markup language. In addition, other user interface components may be style sheets for controlling the appearance and behavior of features within user interfaces.

The general-purpose components in the toolkit may provide a wide variety of functionalities. In one example, the general-purpose components include a script that configures a virtualization system such that the virtualization system has a given number of operating systems on standby. In another example, the general-purpose components include a script that tracks the throughput of a router. In yet another example, the general-purpose components include a compiled application that generates an image of a topology of a corporate computer network. In yet another example, the general-purpose components include scripts for network management. Example scripts for network management include, but are not limited to, scripts for removing software from computing devices on a network, scripts for identifying computing devices on a network that lack software patches, scripts for identifying computing devices on a network that are not running up-to-date anti-malware software, scripts for installing software on computing devices on a network, and so on. In yet another example, the general-purpose components include scripts for logging events generated by a computer system. In yet another example, the general-purpose components include scripts for generating reports regarding performance of computer systems. In yet another example, the general-purpose components include scripts for storing and managing multiple user passwords.

Various entities can host the general-purpose components in the toolkit. In one example embodiment, all of the general-purpose components in the toolkit are hosted by the hosting provider computing devices 210. In another example embodiment, some of the general-purpose components in the toolkit are hosted by the toolkit manager computing device 204 and some of the general-purpose components in the toolkit are hosted by the hosting provider computing devices 210.

The toolkit manager uses the toolkit manager computing device 204 to update general-purpose components in the toolkit. For example, a security issue may be detected in one of the general-purpose components. In this example, the toolkit manager uses the toolkit manager computing device 204 to update the general-purpose component to address the security issue. The toolkit manager then uses the toolkit manager computing device 204 to cause the hosting provider computing devices 210 to host the updated version of general-purpose component instead of the original version of the general-purpose component. In another example, the toolkit manager uses the toolkit manager computing device 204 to inspect and test the general-purpose components in the toolkit to help ensure they do not pose security risks. Furthermore, in some embodiments, the toolkit manager uses the toolkit manager computing device 204 to develop general-purpose components to satisfy needs of the ISVs.

A variety of entities may develop the general-purpose components in the toolkit. For example, the toolkit manager can develop some of the general-purpose components in the toolkit. In another example, the ISVs can develop general-purpose components. In this other example, the ISVs can submit the general-purpose components to the toolkit for use by other ISVs. Alternatively, in this other example, the toolkit manager and/or the end users can compensate the ISVs for the general-purpose components added to the toolkit. In yet another example, a third party develops general-purpose components. The third party submits the general-purpose components to the toolkit. The third party can submit the general-purpose component to the toolkit as a donation or can arrange a compensation agreement with the toolkit manager. For example, a third party could be entitled to $1 each time one of the third party's general-purpose components is used in a system administration solution. In this way, the third party is compensated based on a number of times the third party's general-purpose component is used in system administration solutions. In this example, the toolkit manager would be responsible for tracking usage of the third party's general-purpose components and reimbursing the third party. In another example, the third party could be entitled to a fixed fee when the ISVs develop system administration solutions that include the third party's general-purpose components. In this way, the toolkit manager provides a marketplace where third parties can sell and ISVs can buy general-purpose components for use in system administration solutions.

When general-purpose components are submitted for inclusion in the toolkit, the toolkit manager uses the toolkit manager computing device 204 to validate the general-purpose components to determine whether they pose security threats. The toolkit manager uses the toolkit manager computing device 204 to add the submitted general-purpose components to the toolkit when the submitted general-purpose components are successfully validated.

The ISVs use the ISV computing devices 202 to develop system administration solutions for the end users. In some embodiments, the system administration solutions include web applications that allow the end users to use the end user computing devices 208 to perform administration tasks on the on-premises computer systems 212. The ISVs can develop a wide variety of different system administration solutions to perform a wide variety of administration tasks. For example, an ISV can develop a system administration solution that enables an end user to administer a virtualization system. In another example, an ISV can develop a system administration solution that enables an end user to administer a patch management system that manages software patches on computing devices. In yet another example, an ISV can develop a system administration solution that enables an end user to manage assets on a computer network. In yet another example, an ISV can develop a system administration solution that enables an end user to manage the configurations of computing devices. In yet another example, an ISV can develop a system administration solution that enables an end user to manage the deployment of anti-virus software on computing devices. In yet another example, an ISV can develop a system administration solution that enables an end user to install software on computing devices. In yet another example, an ISV can develop a system administration solution that enables an end user to trouble shoot computing devices and/or network devices. In yet another example, an ISV can develop a system administration solution that enables an end user to manage logs of network devices and/or computing devices. In yet another example, an ISV can develop a system administration solution that enables an end user to control access to confidential information.

To develop system administration solutions, the ISVs interact with the ISV computing devices 202 to use the toolkit website to identify general-purpose components that would be useful in the system administration solutions. For example, the toolkit website may describe a general-purpose component for periodically pinging computing devices on a network to determine whether the computing devices are online. In this example, an ISV developing a system administration solution for managing assets in a computer network might identify this general-purpose component as useful in the system administration solution.

If one of the ISVs is unable to identify a general-purpose component in the toolkit that satisfies a need of a system administration solution, the ISV develops a special-purpose component that satisfies the need. When the ISVs develop special-purpose components, the ISVs use the ISV computing devices 202 to store the special-purpose components at the hosting provider computing devices 210. The ISVs implement the special-purpose components in a variety of ways. For example, the ISVs may implement special-purpose components as scripts, APIs, compiled programs, user interface components, and so on.

The ISVs can develop special-purpose components having a wide variety of functionalities. For example, an ISV may be developing a system administration solution for administering a building's security system. In this example, the ISV needs a component that identifies gaps in video streams from security cameras. Furthermore, in this example, the general-purpose components in the toolkit might not include such a component.

In another example, the ISVs develop special-purpose components that knit together various general-purpose components to form system administration solutions. For example, an ISV develops a set of web pages. In this example, the web pages include features that cause general-purpose components in the toolkit to be utilized. For example, one of the web pages may include a link captioned "identify computers on network with obsolete antivirus software." Clicking on the link causes the execution of a script in the toolkit that identifies computers on a network with obsolete antivirus software.

The toolkit manager uses the toolkit manager computing device 204 to configure the hosting provider computing devices 210 such that the end user computing devices 208 are able to utilize components in the toolkit on a software-as-a-service (SaaS) basis. In other words, the toolkit manager configures the hosting provider computing devices 210 such that the ISV computing devices 202 and the end user computing devices 208 can download components in the toolkit and the toolkit manager licenses the components in the toolkit to the ISVs and the end users as services on demand. Because the toolkit manager licenses the components to users for use as services on demand, the components in the toolkit, in some embodiments, do not stay permanently resident on the ISV computing devices 202 or the end user computing devices 208. For example, the components in the toolkit may include a script that is downloaded to a computing device of a user of a system administration solution when the script is needed. In this example, the script is deleted from the computing device when the script has finished execution. In another example, the components in the toolkit include an API that remains at a computing device of the toolkit manager. Functionality of the API is only used when methods of the API are invoked by remote procedure calls sent by a computing device of a user of a system administration solution. In other possible embodiments, at least some component, code, data, or the like may stay resident on the ISV computing devices 202, the end user computing devices 208, or the on-premise computing systems 212.

To use components of system administration solutions, the end users interact with the end user computing devices 208 to send requests for the components to the hosting provider computing devices 210. The hosting provider computing devices 210 respond to the requests by sending the components to the end user computing devices 208. When the end user computing devices 208 receive the components, the end user computing devices 208 process the components. Because the components can be implemented in different ways, the end user computing devices 208 process the components in different ways. For example, a web page may be a component of a system administration solution. In this example, a web browser application at one of the end user computing devices 208 processes the component by rendering and displaying the web page. In another example, a script may be a component of a system administration solution. In this other example, a script execution application at one of the end user computing devices 208 processes the component by executing the script.

Because the hosting provider computing devices 210 provide access to the general-purpose components on a SaaS basis, computing devices that use the general-purpose components use the most current versions of the general-purpose components. For example, a security issue may be detected in one of the general-purpose components. In this example, the toolkit manager uses the toolkit manager computing device 204 to update the general-purpose component to address the security issue. The toolkit manager then uses the toolkit manager computing device 204 to cause the hosting provider computing devices 210 to host the updated version of general-purpose component instead of the original version of the general-purpose component. Because the hosting provider computing devices 210 provide the general-purpose component on a SaaS basis, the next time one of the ISV computing devices 202 or the end user computing devices 208 makes a request for the general-purpose component, the ISV computing device or the end user computing device downloads and uses the updated version of the general-purpose component. In this way, the ISV computing devices 202 and the end user computing devices 208 utilize current versions of the general-purpose components. In some circumstances, this may reduce costs of the ISVs to develop system administration solutions and costs of the end users to maintain and update the system administration solutions.

In some circumstances, the end users use web browser applications operating on end user computing devices 208 to send requests for components to appropriate ones of the hosting provider computing devices 210. If the components are downloaded to the users' computing devices in response to the requests, the components typically operate in sandboxes. A sandbox is an area of a computing device where untrusted software can execute without threatening the security of the computing device or computing devices communicating with the computing device. In other words, the software in the sandbox does not have local administrator privileges.

Some components of system administration solutions can function properly without local administrator privileges. For example, web pages in system administration solutions can function properly (i.e., be rendered and displayed by a web browser application) without local administrator privileges. Other components of system administration solutions cannot function properly without local administrator privileges. For example, the components of a system administration solution may include a script that collects computer names of each computer on a local area network and sends the computer names to one of the hosting provider computing devices 210. This script on a random website could present a serious invasion of privacy. Accordingly, web browser applications are built such that scripts without local administrator privileges cannot cause computing devices to access other computing devices on the computing device's local area network. For this reason, the script might not function properly. Nevertheless, the script may be very useful in a system administration solution for administering the local area network.

The toolkit manager uses the toolkit manager computing device 204 to include an agent in the toolkit. The agent is a general-purpose component in the toolkit. To use a system administration solution, the end users grant local administrator privileges to the agent. In various embodiments, the end users grant local administrator privileges to the agent in various ways. In one example, the end users grant local administrator privileges to the agent by adding the hosting provider computing devices 210 to lists of trusted websites. Web browser applications automatically allow any resources received from websites on the list of trusted websites to have local administrator privileges. In another example, the end users grant local administrator privileges to the agent by affirmatively allowing the agent to have local administrator privileges in response to a message displayed upon download of the agent.

In various embodiments, the agent is implemented in different ways. For example, in one example embodiment, the agent is a ClickOnce application. A user can install and run a ClickOnce application by clicking on a link on a web page. ClickOnce applications operate with local administrator privileges. In another example embodiment, the agent is an ActiveX control. Like ClickOnce applications, ActiveX controls operate with local administrator privileges.

The agent downloads and processes other components of system administration solutions that require local administrator privileges. For example, a system administration solution could include a script that identifies the computer names of each computing device on a local area network. As discussed above, if a web browser application executed this script, the web browser application would prevent the script from accessing the other computing devices on the local area network. However, because the agent executes the script instead of the web browser and because the agent has local administrator privileges, the script is able to cause the end user's computing device to access the other computing devices on the local area network.

Like other general-purpose components in the toolkit, the hosting provider computing devices 210 provide the agent to the ISV computing devices 202 and the end user computing devices 208 on a SaaS basis. Because the agent is provided on a SaaS basis, the agent is not, in some embodiments, permanently resident on the ISV computing devices 202 or the end user computing devices 208. Consequently, the ISV computing devices 202 and the end user computing devices 208 only use a most up to date version of the agent. In other embodiments, at least some component, code, data, or the like may stay resident on the ISV computing devices 202, the end user computing devices 208, or the on-premise computing systems 212.

Components in the toolkit generate data. Data generated by the components is stored by the hosting provider computing devices 210 for later use. For example, a script in a system administration solution identifies computer names of computing devices on a local area network and returns the computer names to the one of the hosting provider computing devices 210 that hosts the system administration solution. In this example, the hosting provider computing device stores the computer names. Furthermore, in this example, another component of the system administration solution uses the computer names stored by the hosting provider computing devices 210 to generate a web page listing the computer names.

In various embodiments, components of system administration solutions return data generated by the components to the hosting provider computing devices 210 in various ways. In one example embodiment, the agent receives data generated by components. In this example embodiment, the agent formats the data in a format that is understood by the hosting provider computing devices 210 and sends the formatted data to the hosting provider computing devices 210.

Figure 3:
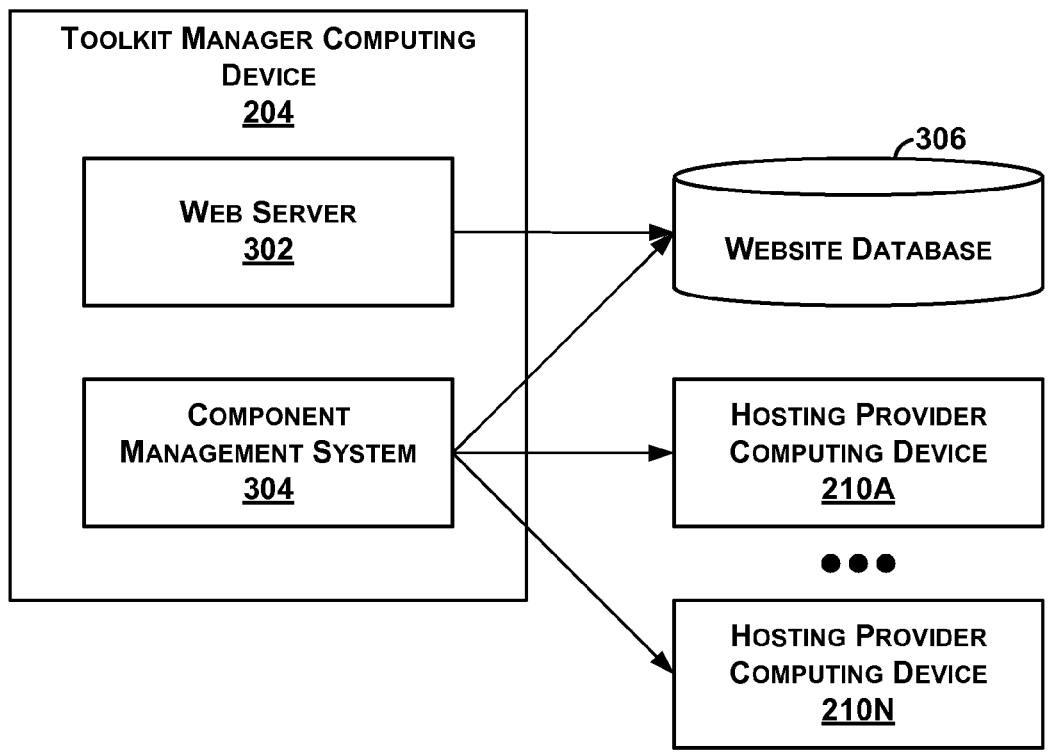
FIG. 3 is a block diagram illustrating example logical components of a toolkit manager.

FIG. 3 is a block diagram illustrating example logical components of the toolkit manager computing device 204. As used in this patent document, logical components include sub-parts of a system, the sub-parts having a well-defined purposes and functionalities.

As illustrated in the example of FIG. 3, the toolkit manager computing device 204 includes a web server 300 and an access management system 302. A website database 306 is accessible to the web server 302. It should be appreciated that in other embodiments, the toolkit manager computing device 204 includes more or fewer logical components than those illustrated in the example of FIG. 3. Furthermore, the example of FIG. 3 is explained with reference to other figures of this patent document. It should be appreciated that the toolkit manager computing device 204 illustrated in the example of FIG. 3 may be used with components and operations other than those illustrated in the figures of this patent document.

The web server 302 responds to requests for resources in the toolkit website. In different embodiments, the web server 302 can be implemented in different ways. For example, the web server 302 may be implemented as the Apache HTTP Server, the Microsoft™ Internet Information Services web server, the IBM HTTP Server, or another type of web server.

The website database 306 stores resources used by the web server 302 to provide resources in the toolkit website. In different embodiments, the website database 306 can be implemented in different ways. For example, in one embodiment, the website database 306 is implemented in a file system. In another embodiment, the website database 306 is implemented in a relational database. Furthermore, in different embodiments, the website database 306 can be stored at different places. For example, in one example embodiment, the website database 306 is stored at one or more computer readable data storage media located within a computing device maintained by the toolkit manager. In another example embodiment, the website database 306 is stored at one or more computer readable data storage media located within a computing device maintained by one of the hosting providers.

To respond to a request for a resource in the toolkit website, the web server 302 accesses one or more resources in the website database 306. For example, the web server 302 may respond to a request by retrieving a static HTML file from the website database 306. In another example, the web server 302 may respond to a request by retrieving one or more server-side scripts from the website database 306 and executing the one or more server-side scripts to generate a resource indicated by the request.

The component management system 304 enables the toolkit manager to manage the general-purpose components in the toolkit. In various embodiments, the component management system 304 is implemented in a variety of ways. In one example embodiment, the component management system 304 is implemented as a set of software instructions executed by processing units of one or more computing devices managed by the toolkit manager. In another example embodiment, the component management system 304 is a system administration solution hosted by one or more of the hosting provider computing devices 210. In this other embodiment, the component management system 304 comprises web pages that the toolkit manager uses to manage the general-purpose components in the toolkit. In other embodiments, the component management system 304 may present other types of interfaces to the toolkit manager, such as command line interfaces or native graphical user interfaces.

The component management system 304 enables the toolkit manager to manage the general-purpose components in the toolkit in a variety of ways. In one example embodiment, the component management system 304 enables the toolkit manager to add new general-purpose components to the toolkit. When the toolkit manager uses the component management system 304 to add a new general-purpose component to the toolkit, the component management system 304 causes the hosting provider computing devices 210 to host the new general-purpose component. In addition, when the toolkit manager uses the component management system 304 to add the new general-purpose component to the toolkit, the component management system 304 updates resources in the website database 306 such that the toolkit website includes a description of the new general-purpose component and a link to the new general-purpose component hosted by one or more of the hosting provider computing devices 210. In another example, the component management system 304 enables the toolkit manager to update general-purpose components in the toolkit. In yet another example, the component management system 304 enables the toolkit manager to remove general-purpose components from the toolkit.

Figure 4:
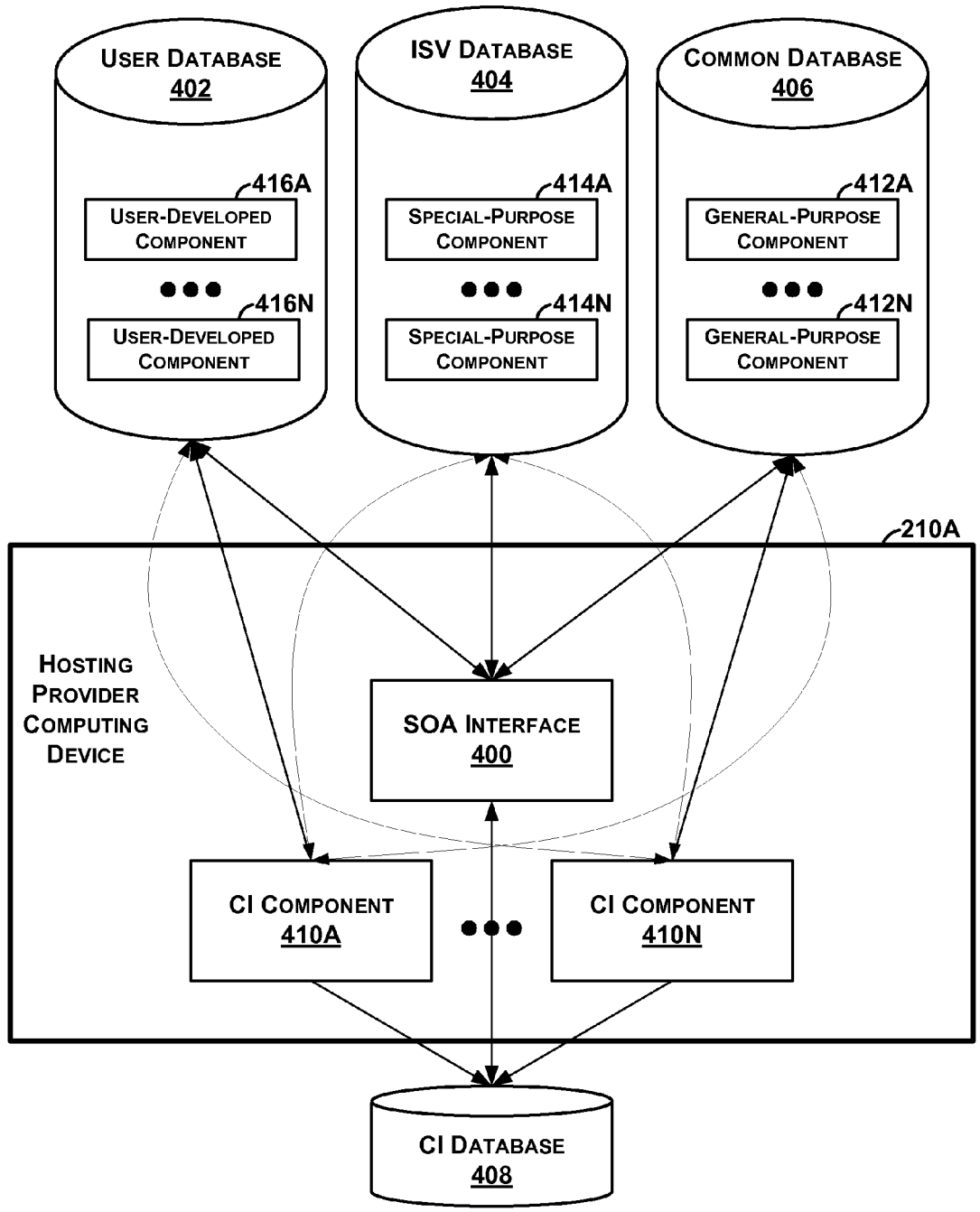
FIG. 4 is a block diagram illustrating example logical components of a user device.

FIG. 4 is a block diagram illustrating example logical components of the hosting provider computing device 210A. Although the example of FIG. 4 is explained with reference to the hosting provider computing device 210A, it should be appreciated that other ones of the hosting provider computing devices 210 may include similar logical components. Furthermore, the example of FIG. 4 is explained with reference to other figures of this patent document. It should be appreciated that the hosting provider computing device 210A illustrated in the example of FIG. 4 may be used with components and operations other than those illustrated in the figures of this patent document.

As illustrated in the example of FIG. 4, the hosting provider computing device 210A includes a Service-Oriented Architecture (SOA) interface 400 and collective intelligence (CI) components 410A-410N (collectively, "CI components 410"). It should be appreciated that hosting providers in other embodiments include more or fewer logical components. Furthermore, as illustrated in the example of FIG. 4, a user database 402, an ISV database 404, a common database 406, and a CI database 408 are accessible to the hosting provider computing device 210A.

The SOA interface 400 handles service requests received by the hosting provider computing device 210A. In different embodiments, the SOA interface 400 can be implemented in different ways. In one example embodiment, a processing unit of the hosting provider computing device 210A executes software instructions. Execution of the software instructions causes the hosting provider computing device 210A to handle service requests received by the hosting provider computing device 210A. In another example embodiment, the hosting provider computing device 210A includes one or more ASICs. The ASICs perform operations that cause the hosting provider computing device 210A to handle service requests received by the hosting provider computing device 210A.

The SOA interface 400 receives and processes a variety of different types of service requests. For example, the SOA interface 400 receives and processes service requests to retrieve resources stored in the user database 402, the ISV database 404, the common database 406, and the CI database 408. In another example, the SOA interface 400 receives and processes service requests to store data into the user database 402, the ISV database 404, and the common database 406. In yet another example, the components of system administration solutions include APIs. In this example, the SOA interface 400 receives and processes service requests that request invocation of methods of the APIs.

In some embodiments, the SOA interface 400 implements database caching techniques. For example, when the SOA interface 400 receives a request to write data to the user database 402, the ISV database 404, or the common database 406, the SOA interface 400 temporarily caches the data and immediately responds to the request by indicating that the data was written to the appropriate database. The SOA interface 400 subsequently writes the data to the appropriate database when processing resources allow. Furthermore in this example, when the SOA interface 400 receives a request to retrieve data from the user database 402, the ISV database 404, or the common database 406, the SOA interface 400 returns the data from the cache if the data is in the cache, otherwise the SOA interface 400 queries an appropriate one of the databases for the data.

The user database 402 stores data specific to individual ones of the end users. The ISV database 404 stores data specific to individual ISVs. The common database 406 stores data that can be used by ISVs and end users. The CI database 408 stores data used for CI purposes. In various embodiments, the user database 402, the ISV database 404, the common database 406, and the CI database 408 can be implemented in various ways. For example, the user database 402, the ISV database 404, the common database 406, and/or the CI database 408 can be implemented as relational databases. In other example embodiments, the user database 402, the ISV database 404, the common database 406, and/or the CI database 408 are implemented as file systems, directories, object-oriented databases, online analytical processing (OLAP) cubes, or other types of databases.

The common database 406 stores data, such as general-purpose components 412A-412N (collectively, "general-purpose components 412"), that can be used by ISVs and end users. The general-purpose components 412 are general-purpose components in the toolkit. In some embodiments, the general-purpose components in the toolkit include general-purpose components in addition to the general-purpose components 412 stored in the common database 406. In such embodiments, one or more third parties provide the additional general-purpose components. When ISVs want to include such additional general-purpose components in system administration solutions, the toolkit manager uses the toolkit manager computing device 204 to configure the hosting provider computing devices 210 to handle transactions to purchase rights to the additional general-purpose components from the third parties on behalf of the ISVs.

The ISV database 404 stores data, such as special-purpose components 414A-414N (collectively, "special-purpose components 414"), belonging to individual ones of the ISVs. Typically, the ISV computing devices 202 are not permitted to access data in the ISV database 404 belonging to other ones of the ISVs. The special-purpose components 414 are components developed by the ISVs. The ISVs can develop the special-purpose components 414 for specific system administration solutions.

The ISVs can offer their special-purpose components 414 for sale without contributing the special-purpose components 414 as the general-purpose components. The toolkit manager uses the toolkit manager computing device 204 to manage the toolkit website such that the toolkit website includes descriptions of the special-purpose components 414. End users use the end user computing devices 208 and ISVs use the ISV computing devices 202 to access the toolkit website and identify ones of the special-purpose components 414 that would be useful in various system administration solutions. The end users use the end user computing devices 208 and the ISVs use the ISV computing devices 202 to purchase the rights to use individual ones of the special-purpose components 414 from the ISVs who developed the special-purpose components. The toolkit manager configures the hosting provider computing device 210A to provide a payment infrastructure in the toolkit website. The end users and the ISVs can use the payment infrastructure to pay for the special-purpose components.

The user database 402 stores data belonging to individual end users. Typically, the end users are not permitted to access data in the user database 402 belonging to other ones of the end users. In various embodiments, the end users store various types of information in the user database 402. For example, the user database 402 stores data generated by components of system administration solutions that administer the on-premises computer systems 212 of the end users. In this example, a component of a system administration solution that administers an end user's network assets generates data listing computer names of computers on the end user's local area network. In this example, the user database 402 stores the data listing the computer names of computers on the end user's local area network.

In another example, the end users use the end user computing devices 208 to store user-developed components 416A-416N (collectively, "user-developed components 416") of system administration solutions in the user database 402. The user-developed components 416 extend or modify system administration solutions after the ISVs develop the system administration solutions. For example, an ISV develops a system administration solution for managing network assets of the end user. In this example, the system administration solution developed by the ISV may include a script that lists the names of users of computing devices. Furthermore, in this example, the end user may want the names of the users and the telephone numbers of the users listed. Accordingly, in this example, the end user modifies the script such that the script lists the names of the users and the telephone numbers of the users, thereby developing a user-developed component. The modified script is stored in a section of the user database 402 associated with the end user. The modified component is then used as though the modified component were any other type of component in the system administration solution.

The collective intelligence (CI) database 408 stores CI data. The CI components 410 aggregate data in the user database 402, the ISV database 404, and/or the common database 406 to generate the CI data stored in the CI database 408. In various embodiments, the CI components 410 can be implemented in various ways. In one example embodiment, the CI components 410 are implemented as sets of software instructions executed by processing units of the hosting provider computing device 210A.

The CI components 410 generate a wide variety of CI data. General-purpose components in the toolkit can use the CI data for a wide variety of purposes. To exploit the CI data, the ISVs can incorporate general-purpose components that use CI data into system administration solutions. For example, one or more of the CI components 410 use data in the user database 402, the ISV database 404, and/or the common database 406 to automatically generate CI data regarding the relative performance of virtualization systems hosted by computer systems having different numbers of operating systems on standby. In this example, a general-purpose component in the toolkit accesses this CI data to generate a feature on a web page in a system administration solution that administers a virtualization system. The feature indicates to an end user that the end user's virtualization system would have better performance if the computing device that hosts the end user's virtualization system had a given number of operating systems on standby. In another example, the CI components 410 use data in the user database 402, the ISV database 404, and/or the common database 406 to automatically generate CI data indicating relative performance of web servers operating on computing devices having different amounts of RAM. In this other example, a general-purpose component in the toolkit accesses this CI data to generate a feature on a web page in a system administration solution that administers an enterprise's web servers. The feature indicates to an end user that the end user's web servers would have better performance if the computing devices on which the web servers operate had more RAM or would still have satisfactory performance if the computing devices had less RAM.

Furthermore, the ISVs can use general-purpose components that use CI data to make design decisions when developing system administration solutions. For example, one of the CI components 410 uses data in the user database 402, the ISV database 404, and/or the common database 406 to automatically generate CI data indicating which general-purpose components are most frequently used. In this example, an ISV could design a system administration solution such that the most frequently used general-purpose components are easiest for the end user to access.

Figure 5:
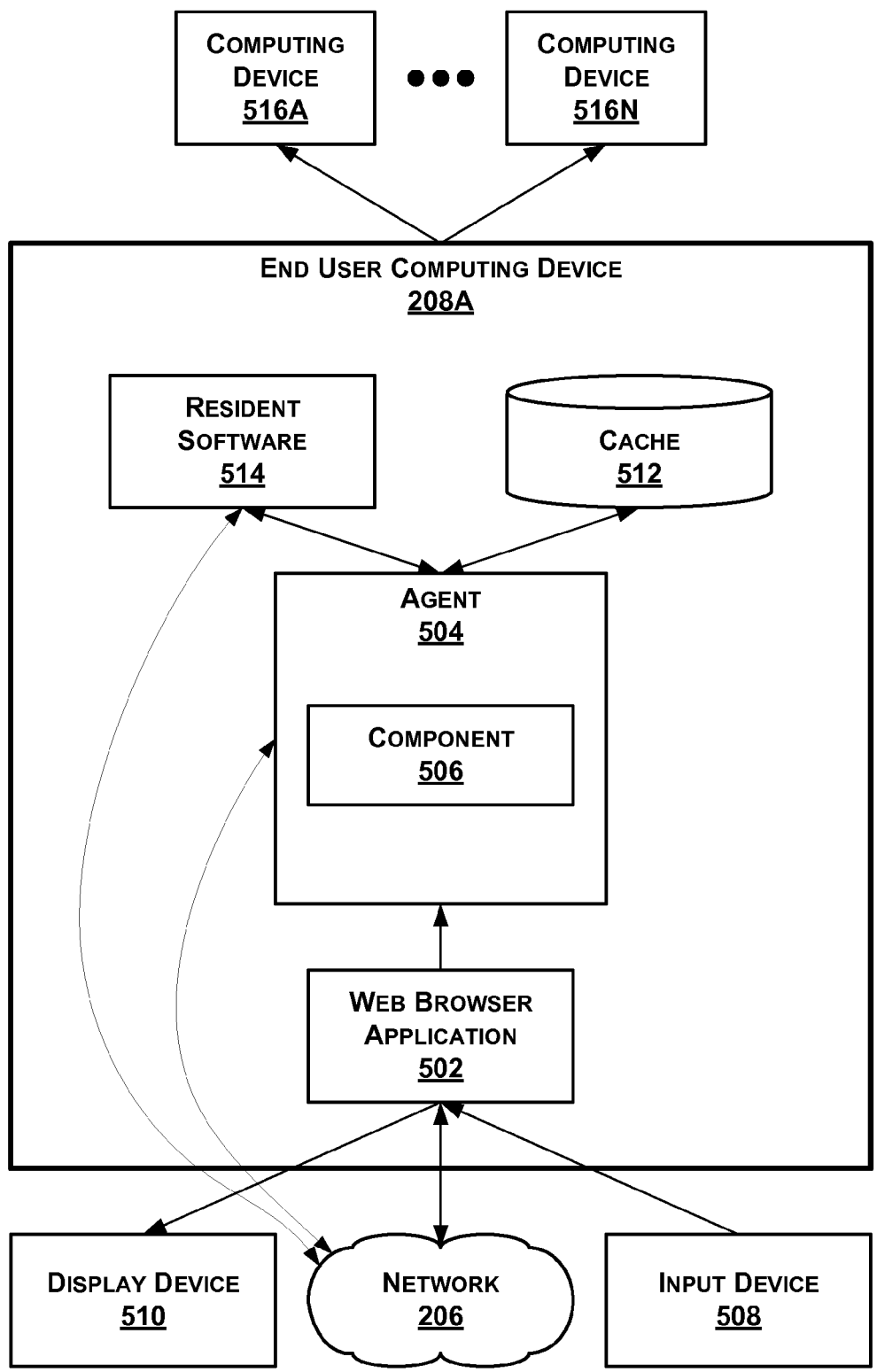
FIG. 5 is a flowchart illustrating example actions of an independent software vendor (ISV) to develop a system administration solution.

FIG. 5 is a block diagram illustrating example logical components of the end user computing device 208A. Although the example of FIG. 5 is explained with reference to the end user computing device 208A, it should be appreciated that other ones of the end user computing devices 208 and ISV computing devices 202 may include similar logical components.

As illustrated in the example of FIG. 5, the end user computing device 208A includes a web browser application 502, an agent 504, a component 506, a cache 512, and resident software 514. It should be appreciated that other logical components of the end user computing device 208A are omitted for the sake of clarity. Furthermore, it should be appreciated that other logical embodiments may include more or fewer logical components than those illustrated in the example of FIG. 5. Furthermore, the example of FIG. 5 is explained with reference to other figures of this patent document. It should be appreciated that the end user computing device 208A illustrated in the example of FIG. 5 may be used with components and operations other than those illustrated in the figures of this patent document.

The example of FIG. 5 also illustrates computing devices 516A-516N (collectively, "computing devices 516"). The computing devices 516 are on-premise computing devices of the end user who operates the end user computing device 208A. In some embodiments, the computing devices 516 are the on-premise computing system 212A. In other embodiments, the on-premise computing system 212A operates on the computing devices 516. The computing devices 516 may be implemented in a variety of ways. For example, the computing devices 516 may be computing devices of the type illustrated in the example of FIG. 1.

In various embodiments, the end user computing device 208A is a variety of different types of computing devices. For example, in various embodiments, the end user computing device 208A is a personal computer, a laptop computer, a netbook computer, a smart phone, a television set top box, a computing device integrated into a vehicle, a personal digital assistant (PDA), a mainframe computer, a supercomputer, mobile telephone, a wearable computer, a video game console, and other types of computing devices.

The web browser application 502 is an application that a user uses to access resources available on a computer network. Example types of web browser applications include, but are not limited to, Microsoft™ Internet Explorer, Mozilla Firefox, Google™ Chrome, Apple™ Safari, the BlackBerry™ web browser, and the Opera web browser by Opera Software. In various embodiments, the web browser application 502 can be implemented in various ways. In one example embodiment, a set of software instructions that, when executed by a processing unit of the end user computing device 208A, cause the end user computing device 208A to provide the web browser application 502.

The cache 512 is a structure for temporarily storing components of one or more system administration solutions. In different embodiments, the cache 512 can be implemented in different ways. In one example embodiment, the cache 512 is implemented in a file system stored on one or more computer readable data storage media accessible to the end user computing device 208A. In another example embodiment, the cache 512 is implemented as a relational database stored on one or more computer readable data storage media accessible to the end user computing device 208A.

A user uses an input device 508 to interact with the web browser application 502. For example, the user may use a mouse, a keyboard, a touch screen, or another type of input device to interact with the web browser application 502. Furthermore, the web browser application 502 displays some resources retrieved from the network 206 on the display device 510.

When the user wants to use a system administration solution, the user uses the input device 508 to instruct the web browser application 502 to retrieve a web page of the system administration solution. In response, the web browser application 502 retrieves data representing the web page from an appropriate one of the hosting provider computing devices 210. For ease of explanation, the discussion of FIG. 5 assumes that the hosting provider computing device 210A is the appropriate one of the hosting provider computing devices 210. When the web browser application 502 retrieves the data representing the web page, the web browser application 502 causes the display device 510 to display the web page.

When the display device 510 displays the web page, the user may use the input device 508 to interact with the web browser application 502 to select a control in the web page. The control is associated with performance of an administrative task that requires the use of a component in the toolkit. In the example of FIG. 5, the control is associated with performance of an administrative task that requires the use of the component 506. When the user selects the control, the web browser application 502 determines whether the agent 504 is operational at the end user computing device 208A. The agent 504 is not stored in the cache 512. Consequently, if the agent 504 is not operational at the end user computing device 208A, the web browser application 502 sends a request to the hosting provider computing device 210A for data representing the agent 504. Upon receiving the data representing the agent 504, the web browser application 502 uses the data representing the agent 504 to install and start the agent 504. The web browser application 502 provides to the agent information indicating the component required by the administrative task associated with the control in the web page.

As discussed briefly elsewhere in this patent document, the agent 504 is a software process that operates outside the sandbox of the end user computing device 208A. In other words, the agent 504 has local administrator privileges. When the agent 504 is operational, the agent 504 determines whether data representing the component 506 is stored in the cache 512. If data representing the component 506 is not stored at the cache 512, the agent 504 retrieves data representing the component 506 from the hosting provider computing device 210A and temporarily stores the data representing the component 506 in the cache 512. In addition, the agent 504 retrieves data indicating the input parameters of the component 506 from the hosting provider computing device 210A. The agent 504 then starts performance of the component 506, providing the input parameters to the component.

In some embodiments, the agent 504 preemptively downloads and stores each component in a system administration solution in the cache 512. In some embodiments, preemptively downloading and storing components in the cache 512 improves the performance of a system administration solution. In embodiments where the agent 504 preemptively downloads components, the agent 504 checks whether a component in the cache 512 is up to date before using the component. Furthermore, in embodiments where the agent 504 preemptively downloads components, a user interface feature may be provided. The user interface feature allows a user to refresh the components stored in the cache 512. In embodiments where the agent 504 preemptively downloads components, the agent 504 may automatically refresh the components stored in the cache 512.

In some embodiments, users are required to accept end user license agreements (EULAs) prior to using individual components. Preemptively downloading and storing such components may reduce the number of times a user has to indicate acceptance of the EULAs for the components. This is because the user may only have to indicate acceptance of the EULAs the first time the user utilizes the components after the agent 504 stores the components in the cache 512.

In other embodiments, the agent 504 downloads and stores components of a system administration solution in the cache 512 only as the components are needed. In yet other embodiments, the agent 504 downloads and stores all components in the toolkit in the cache 512.

In some embodiments, the agent 504 receives information and commands from the component 506 during operation of the component 506. For example, the agent 504 may receive information from the component 506 indicating the progress of a search being performed by the component 506. In this example, the agent 504 can relay the progress to the web browser application 502 such that the web browser application 502 displays the progress on the display device 510. In another example, the agent 504 may receive a command from the component 506 to instruct an operating system of the end user computing device 208A to send particular types of data on the network 206 or to listen for data on particular sockets. In yet another example, the agent 504 may receive a command from the component 506 to send a remote procedure call to an API hosted by the hosting provider computing device 210A via the SOA interface 400. When the agent 504 receives a command from the component 506, the agent 504 responds appropriately to the command.

Where the component 506 generates data, the agent 504 receives the data from the component 506. The agent 504 then formats the data and sends the data to the hosting provider computing device 210A via the SOA interface 400 for storage. In different embodiments, the agent 504 can format the data in different ways. For example, in one embodiment, the agent 504 formats the data as a SOAP request.

Although only one component is shown in the example of FIG. 5, a plurality of components in the toolkit may be operating at the end user computing device 208A concurrently. For example, a dozen components in the toolkit may be operating at the end user computing device 208A concurrently. However, such components are omitted from the example of FIG. 5 for the sake of simplicity.

When the end user computing device 208A communicates with the hosting provider computing device 210A, the end user computing device 208A and the hosting provider computing device 210A encrypt their communications to reduce the risk of hackers spying on the communications. In different embodiments, the end user computing device 208A and the hosting provider computing device 210A can encrypt their communications in different ways. In one example embodiment, the end user computing device 208A and the hosting provider computing device 210A encrypt their communications using Secure Sockets Layer (SSL) or Transport Layer Security (TLS). In other example embodiments, the end user computing device 208A and the hosting provider computing device 210A encrypt their communications using other encryption technologies.

The resident software 514 is a set of software instructions that, when executed by a processing unit of the end user computing device 208A, causes the end user computing device 208A to perform particular behaviors. The resident software 514 is resident at the end user computing device 208A. In other words, the resident software 514 remains on the end user computing device 208A between times when the agent 504 is operating on the end user computing device 208A. In some embodiments, the agent 504 installs the resident software 514 on the end user computing device 208A the first time the agent 504 runs on the end user computing device 208A. The resident software 514 may be installed at any client device that uses a system administration solution developed using the toolkit.

In some embodiments, the resident software 514 is able to perform any operation the agent 504 is able to perform. Furthermore, the resident software 514 performs such operations without end user interaction. Rather, components at the hosting provider computing device 210A control the resident software 514 via commands sent through the SOA interface 400. In some embodiments, end users are able to see actions or results of the resident software 514 via a web page in the system administration solution.

In some embodiments, the resident software 514 performs operations on behalf of the agent 504 on a scheduled basis. The resident software 514 can cause the end user computing device 208A to perform a variety of different types of functionality on a variety of different schedules. For example, the resident software 514 runs a script once per hour to determine if a security violation is reported in a log file. If the resident software 514 determines that a security violation is reported in the log file, the resident software 514 causes the end user computing device 208A to report the security violation via the SOA interface 400 and may take other actions to protect a computing device at which the security violation occurred.

The agent 504 keeps the resident software 514 up to date each time the end user computing device 208A runs the agent 504. Furthermore, in some embodiments, the resident software 514 updates itself. In such embodiments, the resident software 514 updates itself when directed to do so by the hosting provider computing device 210A via the SOA interface 400. To update itself, the resident software 514 checks back with the hosting provider computing device 210A on a predetermined schedule via the SOA interface 400 to determine whether the resident software 514 needs to update itself.

In some embodiments, the resident software 514 and/or the agent 504 communicates directly with the computing devices 516 to perform administration tasks on the computer system 212A. In other embodiments, the resident software 514 and/or the agent 504 communicate with remote APis on the hosting provider computing device 210A via the SOA interface 400. The remote APis are components of the toolkit. In response to communications from the resident software 514 and/or the agent 504, the remote APis communicate with the computing devices 516 to perform administration tasks on the computer system 212A.

Figure 6:
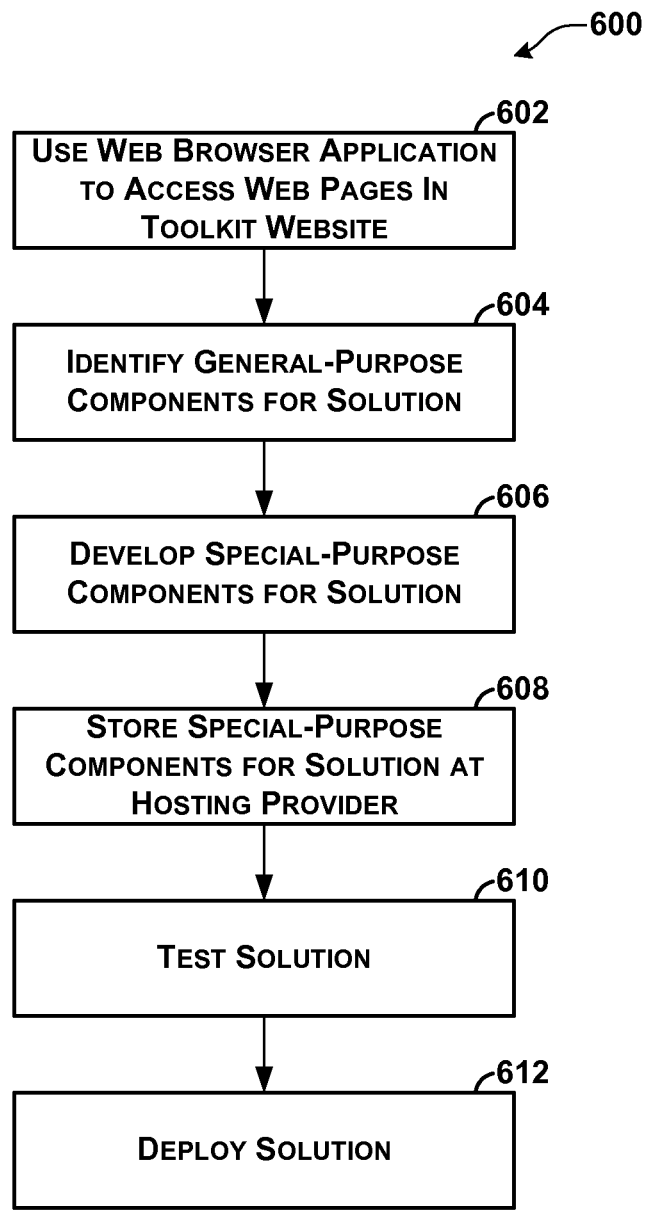
FIG. 6 is a flowchart illustrating an example operation of an end user computing device.

FIG. 6 is a flowchart illustrating example series of actions 600 of one of the ISVs to develop a system administration solution. For ease of explanation, the example of FIG. 6 describes the actions as being performed the ISV that operates the ISV computing device 202A. It should be appreciated that other ones of the ISVs may perform similar series of actions on other ones of the ISV computing devices 202 to develop system administration solutions. Furthermore, it should be appreciated that in other embodiments, the ISVs may perform more or fewer actions to develop a system administration solution. Furthermore, the example of FIG. 6 is explained with reference to other figures of this patent document. It should be appreciated that the series of actions 600 illustrated in the example of FIG. 6 may be used with components and operations other than those illustrated in the figures of this patent document.

As illustrated in the example of FIG. 6, the series of actions 600 begins when a software developer uses a web browser application operating at the ISV computing device 202A to access one or more web pages in the toolkit website provided by the toolkit manager computing device 204 (602). The one or more web pages describe general-purpose components in a toolkit. The software developer then uses the web pages to identify ones of the general-purpose components needed by the system administration solution (604).

After identifying general-purpose components needed by the system administration solution, the software developer uses the ISV computing device 202A to develop special-purpose components to satisfy needs of the system administration solution not satisfied by the general purpose components in the toolkit (606). Development of special-purpose components can entail modifying ones of the general-purpose components. In addition, development of special-purpose components can entail developing the special-purpose components from scratch or based off existing components not in the toolkit.

After developing the special-purpose components, the software developer uses the ISV computing device 202A to store the special-purpose components at an appropriate one of the hosting provider computing devices 210 (608). For ease of explanation, the discussion of FIG. 6 assumes that the appropriate one of the hosting provider computing devices 210 is the hosting provider computing device 210A. As alluded to elsewhere in this patent document, the special-purpose components are stored in a portion of the ISV database 404 associated with the ISV employing the software developer.

Once the software developer stores at least some of the special-purpose components to the hosting provider computing device 210A, the software developer uses the ISV computing device 202A to test the system administration solution (610). The software developer can test the system administration solution in different ways. For example, testing the system administration solution can entail the software developer deploying a sample computer system of the type administered by the system administration solution. The software developer then uses the system administration solution much as an end user would use the system administration solution. That is, the software developer uses a web browser application at the ISV computing device 202A to access web pages of the system administration solution, select controls in the web pages of the system administration solution, download the agent, and so on.

When the software developer has finished testing the system administration solution, the software developer uses the ISV computing device 202A to deploy the system administration solution (612). Deploying the system administration solution entails enabling an appropriate end user to use the system administration solution.

Figure 7:
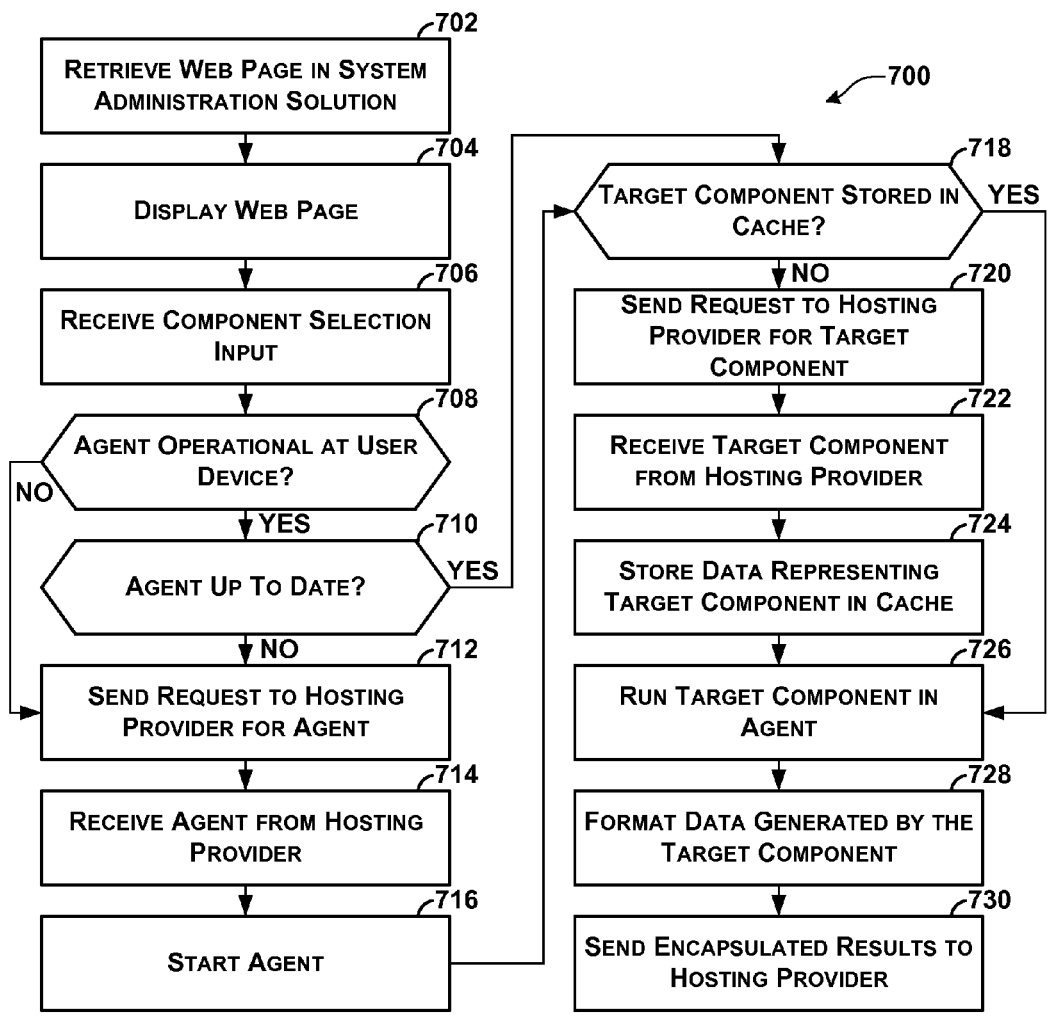
FIG. 7 is a flowchart illustrating an example operation of the toolkit manager.

FIG. 7 is a flowchart illustrating an example operation 700 of an end user computing device to use a system administration solution. For ease of explanation, the example of FIG. 7 is explained with an end user using the end user computing device 208A performing the actions of the operation 700. It should be appreciated that other end users can use other ones of the end user computing devices 208 may perform the operation 700 or other operations. In addition, the example of FIG. 7 is explained with reference to other figures of this patent document. It should be appreciated that other operations to use a system administration solution may be performed using user devices having logical components other than those illustrated in the figures of this patent document. Furthermore, it should be appreciated that other operations to use a system administration solution involve more or fewer actions.

As illustrated in the example of FIG. 7, the operation 700 begins when the end user interacts with the web browser application 502 operating on the end user computing device 208A to retrieve data representing a web page in the system administration solution from an appropriate one of the hosting provider computing devices 210 (702). For ease of explanation, the discussion of FIG. 7 assumes that the hosting provider computing device 210A is the appropriate one of the hosting provider computing devices 210. After the web browser application 502 retrieves the data representing the web page, the web browser application 502 causes the display device 510 to display the web page (704).

When the display device 510 displays the web page, the web browser application 502 receives component selection input from the end user (706). The component selection input indicates that the end user has selected a feature of the web page associated with a component of the system administration solution. The feature of the web page can be a variety of different types of features. For example, the feature of the web page can be a link, a button, an image, an anchor, a form submission button, or another feature of a web page.

In response to receiving the component selection input, the web browser application 502 determines whether the agent 504 is operational at the end user computing device 208A (708). In different embodiments, the web browser application 502 can determine whether the agent 504 is operational at the end user computing device 208A in different ways. For example, the web page may include a script performed by the web browser application 502 when the web browser application 502 receives the component selection input. The script causes the web browser application 502 to determine whether the agent 504 is operational at the end user computing device 208A. If the web browser application 502 determines that the agent 504 is operational at the end user computing device 208A ("YES" of 708), the web browser application 502 determines whether the agent 504 is up to date (710).

If the web browser application 502 determines that the agent 504 is not operational at the end user computing device 208A ("NO" of 708) or if the web browser application 502 determines that the agent 504 is not up to date ("NO" of 710), the web browser application 502 sends a request to the hosting provider computing device 210A via the SOA interface 400 for data representing the agent 504 (712). As alluded to elsewhere in this patent document, the request for data representing the agent 504 may be encrypted. After sending the request for data representing the agent 504, the web browser application 502 receives the data representing the agent 504 from the hosting provider computing device 210A (714). In some embodiments, the data representing the agent 504 is encrypted.

After the web browser application 502 receives the data representing the agent 504, the web browser application 502 starts the agent 504 at the end user computing device 208A (716). In different embodiments, the web browser application 502 can be configured to start the agent 504 in different ways. In one example, execution by the web browser application 502 of a script embedded in the web page causes the web browser application to start the agent 504. In another example, the web page includes a feature associated with a component of a system administration solution. In this other example, the web browser application 502 starts the agent 504 when the user selects the feature. For example, the web page may include a button captioned "Scan." The button is associated with a general-purpose component in the toolkit that scans computing devices on a local area network for viruses. The web browser application 502 starts the agent 504 when the user selects the button.

After the web browser application 502 starts the agent 504 at the end user computing device 208A or after the web browser application 502 determines that the agent 504 is operational at the end user computing device 208A and up to date ("YES" of 710), the agent 504 determines whether the component associated with the component selection input is stored in the cache 512 (718). For ease of explanation, the discussion of FIG. 7 refers to the component associated with the component selection input as the target component.

If the agent 504 determines that the target component is not stored in the cache 512 ("NO" of 718), the agent 504 sends a request to the hosting provider computing device 210A via the SOA interface 400 for data representing the target component (720). In some embodiments, the request for data representing the target component is encrypted. Subsequently, the agent 504 receives the data representing the target component from the hosting provider computing device 210A (722). In some embodiments, the data representing the target component is encrypted. After the agent 504 receives the data representing the target component, the agent 504 temporarily stores the data representing the target component in the cache 512 (724). It should be appreciated that in various embodiments, components of system administration solutions can be stored in caches at other locations. In one example embodiment, the SOA interface 400 caches the components of system administration solutions. In another example embodiment, computing devices of the hosting provider computing devices 210 cache components of system administration solutions.

When the agent 504 stores the data representing the target component in the cache 512 or when the agent 504 determines that the target component is stored in the cache 512 ("YES" of 718), the target component runs in the agent 504 (726). The agent 504 formats data generated by the target component in a format understandable by the hosting provider computing device 210A (728). The agent 504 then sends the formatted data to the hosting provider computing device 210A via the SOA interface 400 (730). In some embodiments, the formatted data is encrypted.

Figure 8:
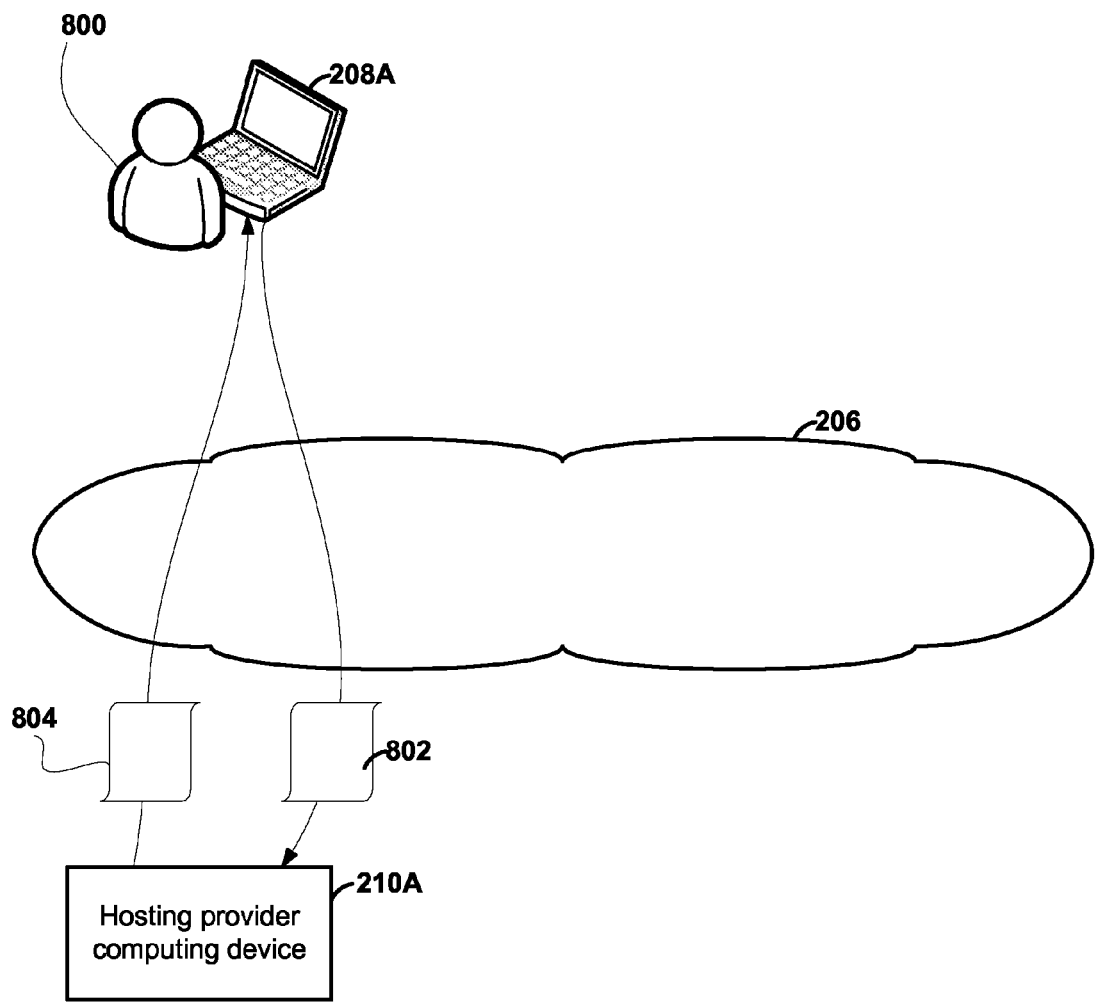
FIG. 8 is a block diagram that illustrates a first part of an example operation to inventory assets of computing systems.

FIG. 8 is an example block diagram that illustrates a first part of an example operation to inventory assets of the computing systems 212. As illustrated in the example of FIG. 8, the end user 800 uses one of the end user computing devices 208. Furthermore, the operation to inventory assets of the computing systems 212 is explained with reference to one of the hosting provider computing devices 210.

The end user 800 uses the web browser application 502 to send a request 802 for an asset management solution to the hosting provider computing device 210. In response to the request, the hosting provider computing device 210 sends an asset inventory solution 804 to the end user computing device 208. The asset inventory solution 804 comprises one or more components.

Figure 9:
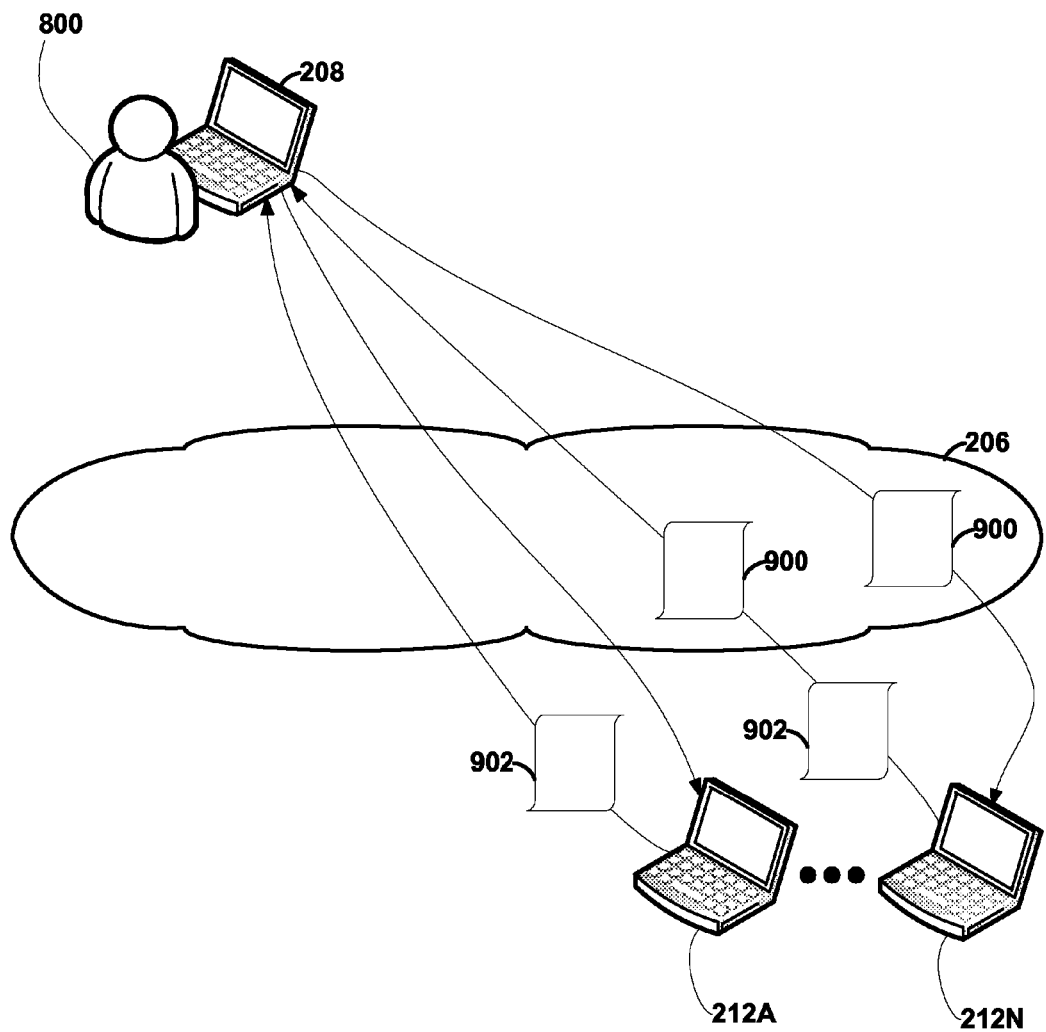
FIG. 9 is a block diagram that illustrates a second part of the example operation to inventory the assets of the computing systems.

FIG. 9 is an example block diagram that illustrates a second part of the example operation to inventory assets of the computing systems 212. When the end user computing device 208 receives the asset inventory solution 804, the end user computing device 208 runs components in the asset inventory solution 804. When the end user computing device 208 runs the components in the asset inventory solution 804, the end user computing device 208 sends information requests 900 to the computer systems 212. In the illustrated embodiment, the end user computing device 208 sends the information requests 900 to the computer systems 212 via the network 206. In other embodiments, the end user computing device 208 sends the information requests 900 to the computer system 212 via another network, such as a local area network.

In various embodiments, the end user computing device 208 sends the information requests 900 to the computer systems 212 in various ways. For example, the end user computing device 208 can have a predefined list of the computer systems 212. In this example, the end user computing device 208 sends the information requests 900 to the computer systems 212 on the list. In another example, the asset inventory solution 804 causes the end user computing device 208 to send device discovery messages (e.g., ping messages) to network addresses on one or more communications networks. In this example, the asset inventory solution 804 causes the end user computing device 208 to send the information requests 900 to computing systems that respond appropriately to the device discovery messages.

In response to the information requests 900, the computer systems 212 send inventories 902 to the end user computing device 208. In the illustrated embodiment, the computer systems 212 send the inventories 902 to the end user computing device 208 via the network 206. In other embodiments, the computer systems 212 send the inventories 902 to the end user computing device 208 via another network, such as a local area network.

The inventories 902 contain information about the assets of the computer systems 212. In various embodiments, the inventories 902 can contain information about various types of assets of the computer systems 212. For example, the inventories 902 can include data regarding the BIOS's of the computer systems 212, data regarding the hard drives of the computer systems 212, data regarding the services provided by the computer systems 212, data regarding the software installed on the computer systems 212, and data regarding the hardware components of the computer systems 212.

In this example, the data regarding the BIOS's of the computer systems 212 can include data that identifies the manufacturers of the BIOS's, version numbers of the BIOS's, data regarding buses of the computing systems 212, and other data regarding the BIOS's of the computing systems 212. Furthermore, in this example, the data regarding the hard drives of the computer systems 212 can include data regarding the manufacturers of the hard drives, interrupts of the hard drives, available storage space on the hard drives, utilization levels of the hard drives, volumes present on the hard drives, speeds of the hard drives, seek times of the hard drives, and other data regarding the hard drives. In this example, the data regarding the services provided by the computing systems 212 can include data regarding print spoolers, web servers, FTP servers, directory services, registry parameters, and other services provided by the computing systems 212. In this example, the data regarding the software installed on the computing systems 212 can include data regarding applications such as word processor applications, spreadsheet applications, email client applications, web browser applications, database management applications, and other types of software installed on the computing systems 212. In this example, the data regarding the hardware of the computing systems 212 includes data regarding USB ports, printers, chipsets, processing units, input devices, power supplies, memory modules, network interfaces, graphics cards, and other hardware components of the computing systems 212.

In various embodiments, the inventories 902 are formatted in various ways. For example, the inventories 902 can be formatted as sets of XML elements. In another example, the inventories 902 can be formatted as text BLOBs.

An alternate version of the asset inventory solution 804 does not send the information requests 900 or receive the inventories 902 from the computing devices 212. Rather, when the end user computing device 208 runs the asset inventory solution 804, the asset inventory solution 804 inventories the assets of the end user computing device 208. The asset inventory solution 804 then sends the inventory of assets of the end user computing device 208 to the hosting provider computing device 210.

Figure 10:
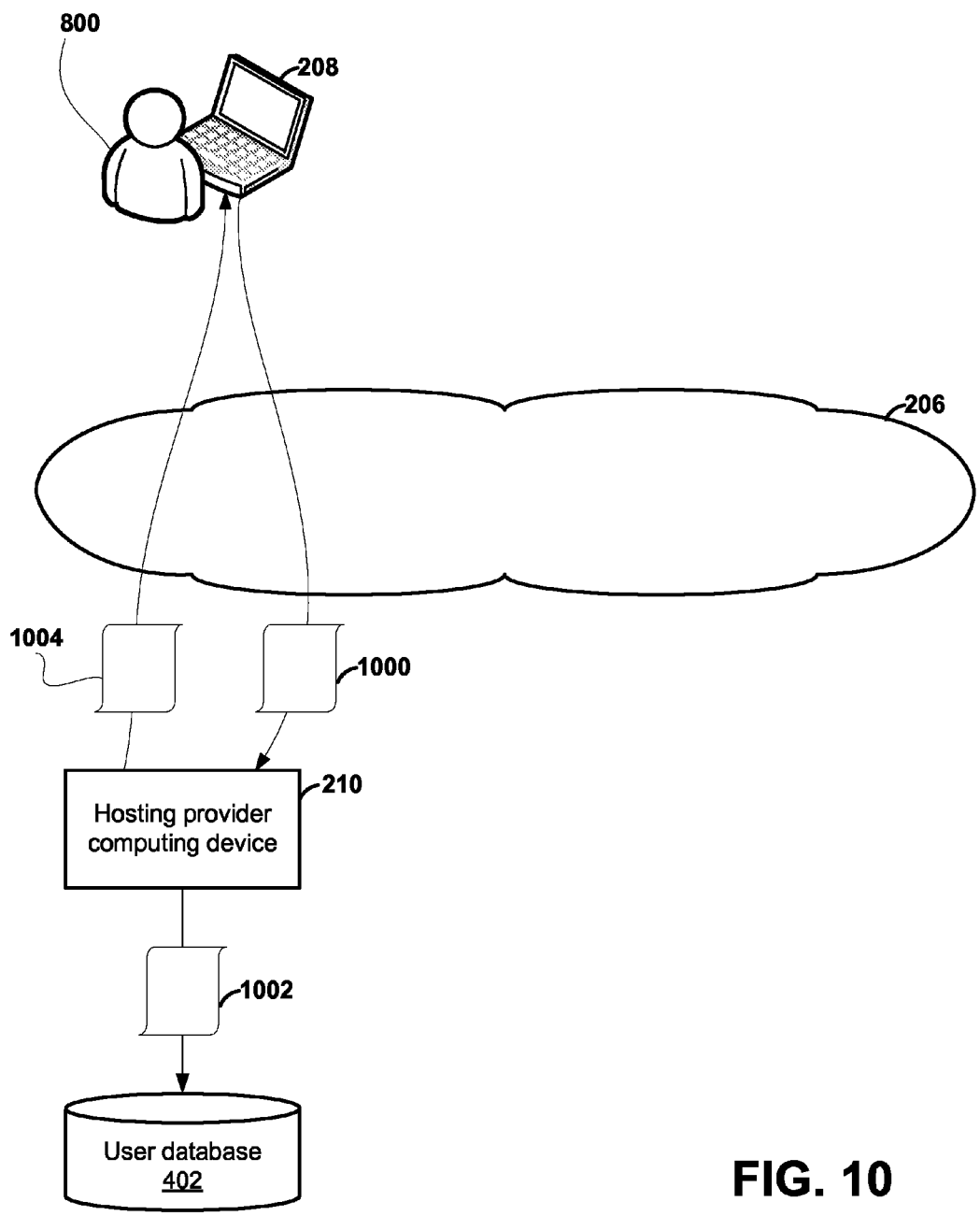
FIG. 10 is a block diagram that illustrates a third part of the example operation to inventory the assets of the computing systems.

FIG. 10 is a block diagram that illustrates a third part of the example operation to inventory assets of the computer systems 212. After the end user computing device 208 receives the inventories 902, the asset inventory solution 804 causes the end user computing device 208 to send result data 1000 to the hosting provider computing device 210. The result data 1000 includes some or all data in the inventories 902. In response to receiving the result data 1000, the hosting provider computing device 210 stores user data 1002 to the user database 402. The user data 1002 is based at least in part on the result data 1000. For example, the user data 1002 can include some or all of the result data 1000. In another example, the hosting provider computing device 210 can transform the result data 1000 in various ways to generate the user data 1002. For example, the hosting provider computing device 210 can transform the result data 1000 from an XML format to a comma separated values format.

Furthermore, after the hosting provider computing device 210 receives the result data 1000, the hosting provider computing device 210 sends webpage data 1004 to the end user computing device 208. The web browser application uses the webpage data 1004 to display a summary webpage to the end user 800. The summary webpage includes elements that summarize the assets of the computing systems 212. For example, the summary webpage can include an element that indicates how many unique software applications are installed on the computer systems 212. In another example, the summary webpage can include an element that indicates how many required software patches are not installed on the computer systems 212.

Figure 11:
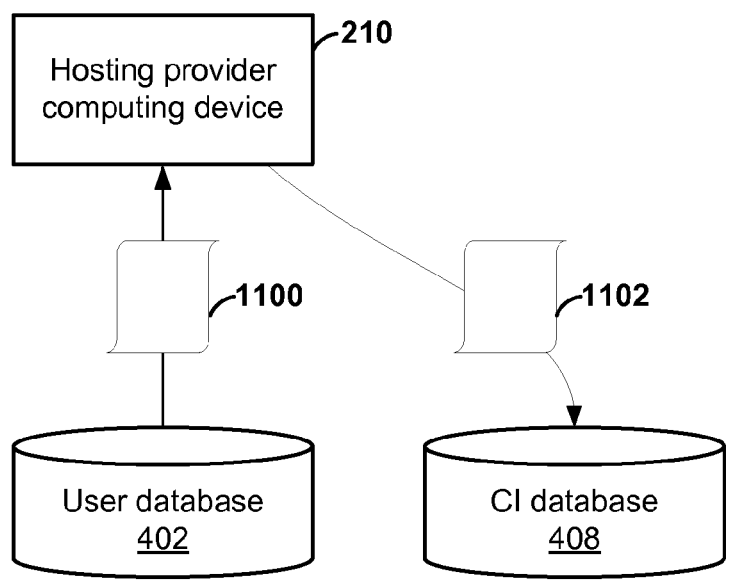
FIG. 11 is a block diagram that illustrates a fourth part of the example operation to inventory the assets of the computing systems.

FIG. 11 is a block diagram illustrating a fourth part of the example operation to inventory assets of the computing systems 212. After the hosting provider computing device 210 stores the user data 1002 into the user database 402, one of the CI components 410 on the hosting provider computing device 210 retrieves user data 1100 from the user database 406. The user data 1100 can include some or all of the user data 1002. The CI component uses the user data 1100 to generate CI data 1102. The CI component then stores the CI data 1102 into the CI database 408.

In various embodiments, the CI data 1102 includes various types of data. For example, the collective intelligence data 1002 can include some or all of the result data 1000. In another example, the CI data 1102 can include data regarding the average number of required software patches missing from computing systems within an organization. In yet another example, the hosting provider computing device 210 can transform the user data 1100 in various ways to generate the collective intelligence data 1102. For example, the hosting provider computing device 210 can transform the user data 1100 to remove personally identifying information from the user data 1100.

Figure 12:
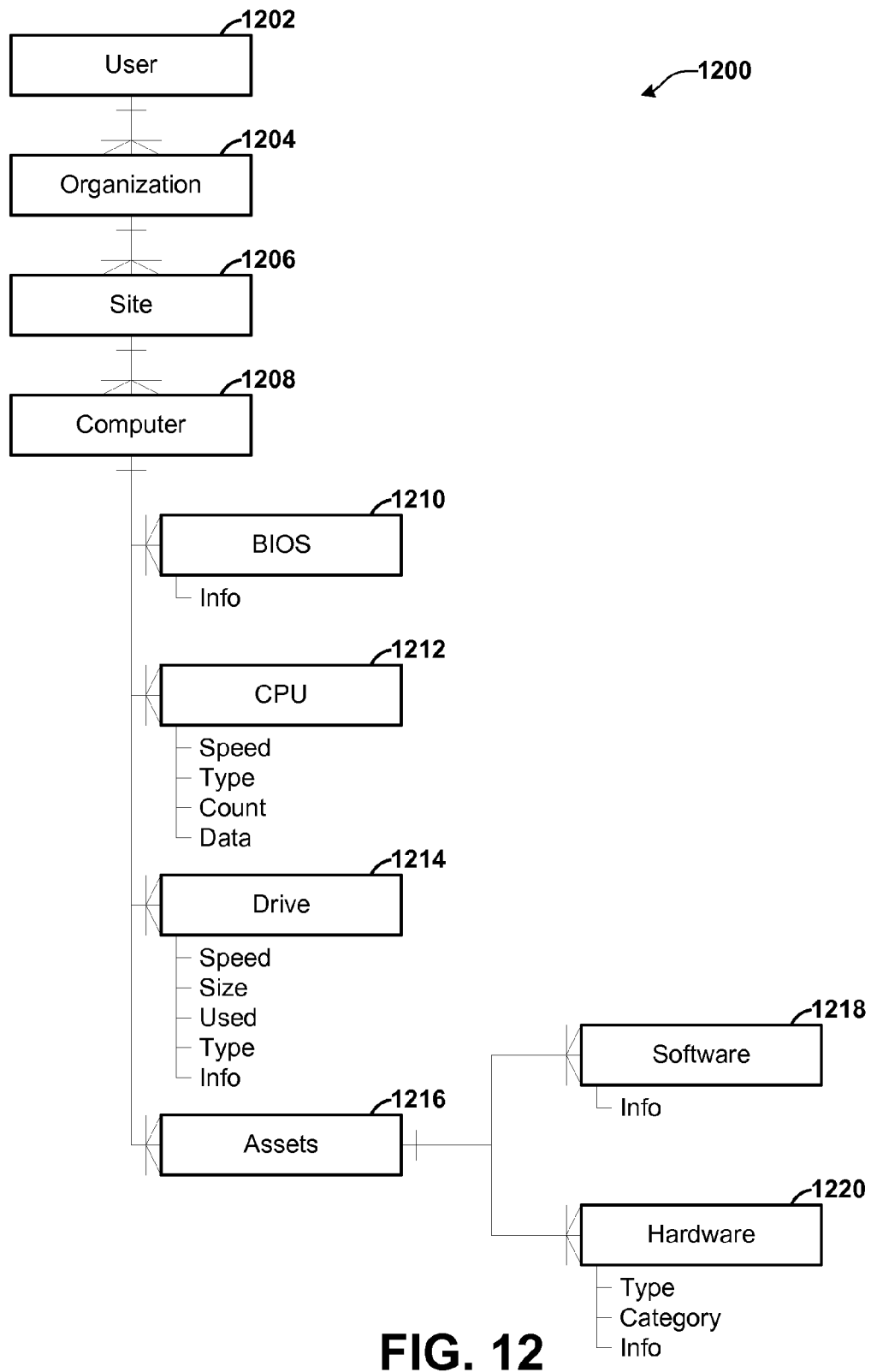
FIG. 12 illustrates an example data model for collective intelligence data.

FIG. 12 illustrates one example data model 1200 for the CI data 1102. As illustrated in the example of FIG. 12, the data model 1200 includes user elements 1202, organization elements 1204, site elements 1206, computer elements 1208, BIOS elements 1210, CPU elements 1212, drive elements 1214, asset elements 1216, software elements 1218, and hardware elements 1220. The CI components 410 in the hosting provider computing devices 210 can data mine the elements in the data model 1200 to generate aggregate data.

Each of the user elements 1202 includes data regarding an individual user. For example, the user elements 1202 can include demographic information about the users.

The organization elements 1204 include data regarding organizations. For example, the organization elements 1204 can include names of organizations, names of officers of the organizations, numbers of employees of organizations, revenues of organizations, and other information regarding organizations. Each of the user elements 1202 is associated with zero or more of the organization elements 1204. A user element for a user is associated with an organization element for an organization when the user belongs to the organization.

The site elements 1206 include data regarding operational sites of organizations. For example, the site elements 1206 can indicate the cities where the sites are located, numbers of employees at the sites, names of officers at the sites, inception dates of the sites, lists of functions performed at the sites, and other data regarding operational sites of organizations. Each of the organization elements 1204 is associated with one or more of the site elements 1206. An organization element for an organization is associated with a site element for an operational site when the organization runs the operational site.

The computer elements 1208 include data regarding computers. Each of the site elements 1206 is associated with one or more of the computer elements 1208. A site element for a site is associated with a computer element for a computer when the computer is located at the site.

The BIOS elements 1210 include data regarding BIOS's. For example, each of the BIOS elements 1210 can specify a manufacturer, a name, a version, a license number, and other data regarding a BIOS. Each of the computer elements 1208 is associated with one or more of the BIOS elements 1210. A computer element for a computer is associated with a BIOS element for a BIOS when the computer has the BIOS.

The CPU elements 1212 include data regarding CPUs. For example, each of the CPU elements 1212 can specify a speed, a type, a core count, and other data regarding a CPU. Each of the computer elements 1208 is associated with one or more of the CPU elements 1212. A computer element for a given computer is associated with a CPU element for a given CPU when the given computer has the given CPU.

The drive elements 1214 include data regarding hard drives. For example, each of the drive elements 1214 can specify a speed of a hard drive, a size of the hard drive, a number of bytes used in the hard drive, a type of the hard drive, and other data regarding a hard drive. Each of the computer elements 1208 is associated with one or more of the drive elements 1214. A computer element for a given computer is associated with a drive element for a given hard drive when the given computer has the given hard drive.

The asset elements 1216 include data regarding a set of assets. Each of the computer elements 1208 is associated with one or more of the asset elements 1216. A computer element for a given computer is associated with an asset element for a given set of assets when the given computer has the given set of assets.

The software elements 1218 include data regarding individual software assets. For example, each of the software assets 1218 can specify a name of a software asset, a version number of the software asset, a license number of the software asset, a manufacturer of the software asset, and other information about the software asset. Each of the asset elements 1216 is associated with one or more of the software elements 1218. An asset element for a given set of assets is associated with a software element for a given software asset when the given set of assets includes the given software asset.

The hardware elements 1220 include data regarding individual hardware assets. For example, each of the hardware assets 1220 can specify a type of a hardware asset, a category for the hardware asset, a manufacturer of the hardware asset, an interface specification for the hardware asset, and other data regarding the hardware asset. Each of the asset elements 1216 is associated with one or more of the hardware assets 1220. An asset element for a given set of assets is associated with a hardware element for a given hardware asset when the given set of assets includes the given hardware asset.

Figure 13:
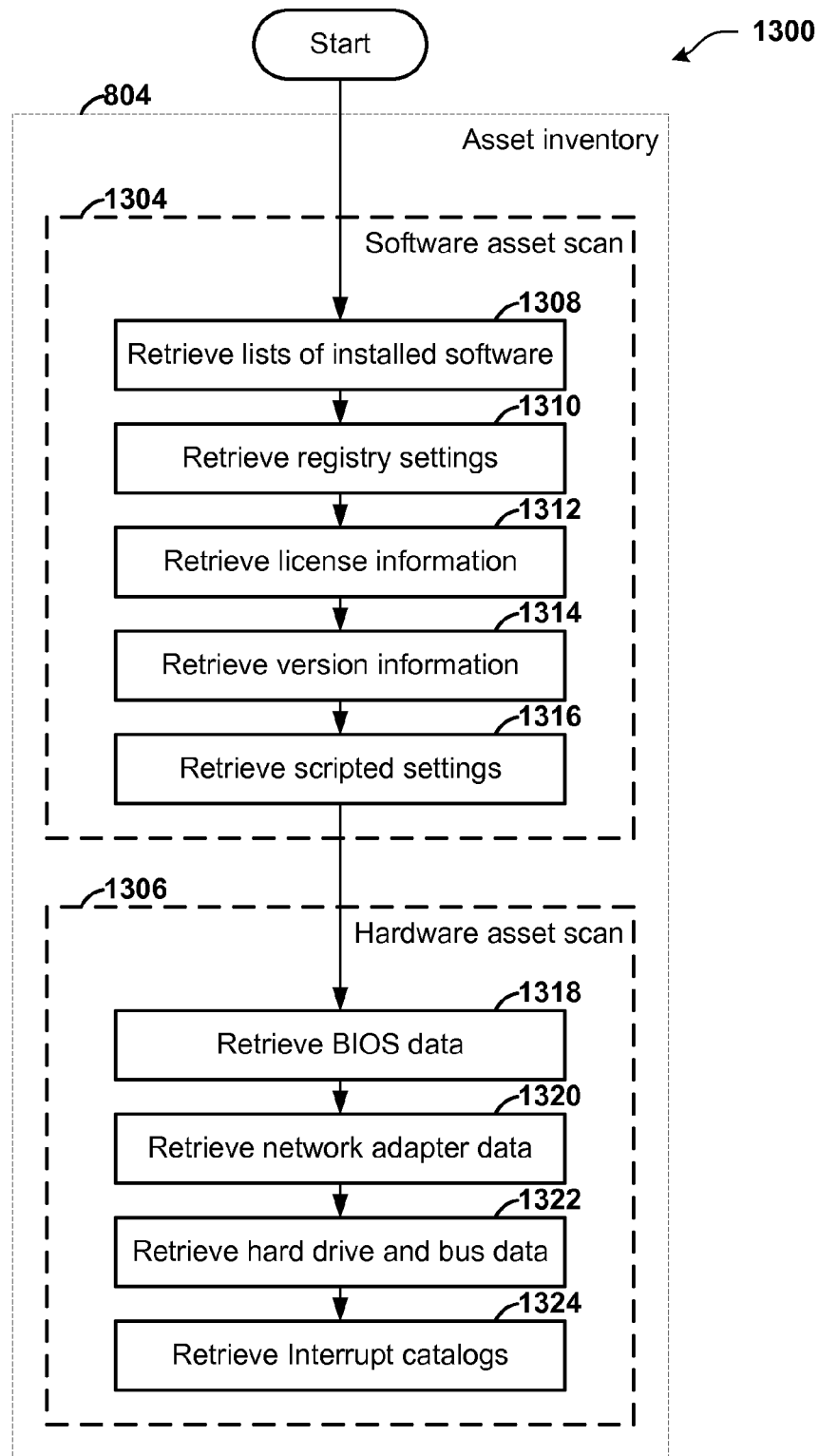
FIG. 13 is a flowchart illustrating an example operation for an asset inventory solution.

FIG. 13 is a flowchart illustrating an example operation 1300 of the asset inventory solution 804. For ease of explanation, this patent document describes the operation 1300 as being performed by the end user computing device 208. However, it should be appreciated that other ones of the end user computing devices 208 can also perform the operation 1300.

As illustrated in the example of FIG. 13, the asset inventory solution 804 comprises a software asset scan component 1304 and a hardware asset scan component 1306. The software asset scan component 1304 and the hardware asset scan component 1306 are components in the toolkit. A developer (e.g., the end user 800) can generate the asset inventory solution 804 by developing a program that invokes the software asset scan component 1304 and the hardware asset scan component 1306.

The end user computing device 208 performs several actions when the end user computing device 208 runs the software asset scan component 1304. As illustrated in the example of FIG. 13, the end user computing device 208 communicates with the computing systems 212 to retrieve lists of software applications installed on the computing systems 212 (1308). The end user computing device 208 then communicates with the computing systems 212 to retrieve registry settings from the computing systems 212 (1310). The end user computing device 208 then communicates with the computing systems 212 to retrieve license information for software applications installed on the computing systems 212 (1312). In addition, the end user computing device 208 communicates with the computing systems 212 to retrieve version information for software applications installed on the computing systems 212 (1314). The end user computing device 208 also communicates with the computing systems 212 to retrieve scripted settings for software applications installed on the computing systems 212 (1316).

The end user computing device 208 performs several actions when the end user computing device 208 runs the hardware asset scan component 1306. As illustrated in the example of FIG. 13, the end user computing device 208 communicates with the computing devices 212 to retrieve data regarding the BIOS's of the computing devices 212 (1318). The end user computing device 208 then communicates with the computing devices 212 to retrieve data regarding the network adapters of the computing devices 212 (1320). The end user computing device 208 then communicates with the computing devices 212 to retrieve hard drive and bus data from the computing devices 212 (1322). Next, the end user computing device 208 communicates with the computing devices 212 to retrieve interrupt catalog data from the computing devices 212 (1324).

FIG. 14 illustrates an example database table 1400 for storing information regarding components in the toolkit. In some embodiments, the user database 402 includes one or more database tables like the database table 1400 to store data regarding the user-developed components 416. Likewise, in some embodiments, the ISV database 404 includes one or more database tables like the database table 1400 to store data regarding the special-purpose components 414. In some embodiments, the common database 406 includes one or more database tables like the database table 1400 to store data regarding the general-purpose components 412.

As illustrated in the example of FIG. 14, the database table 1400 has columns 1402A through 1402F (collectively, "columns 1402") and rows 1404A through 1404N (collectively, "rows 1404"). In some embodiments, the database table 1400 includes columns in addition to the columns 1402A through 1402F. Each of the rows 1404 contains data about a different component. For example, if the database table 1400 is in the user database 402, the rows 1404 contain data about different ones of the user-developed components 416.

Each of the cells in the column 1402A contains a unique identifier for one of the components. Each of the cells in the column 1402B contains a license number for one of the components. Each of the cells in the column 1402C contains a version number for one of the components. Each of the cells in the column 1402D contains an edition identifier for one of the components. Each of the cells in the column 1402E contains a name for one of the components. Each of the cells in the column 1402F contains software code for one of the components. In some embodiments, some cells in the columns 1402 can be empty.

Figure 15:
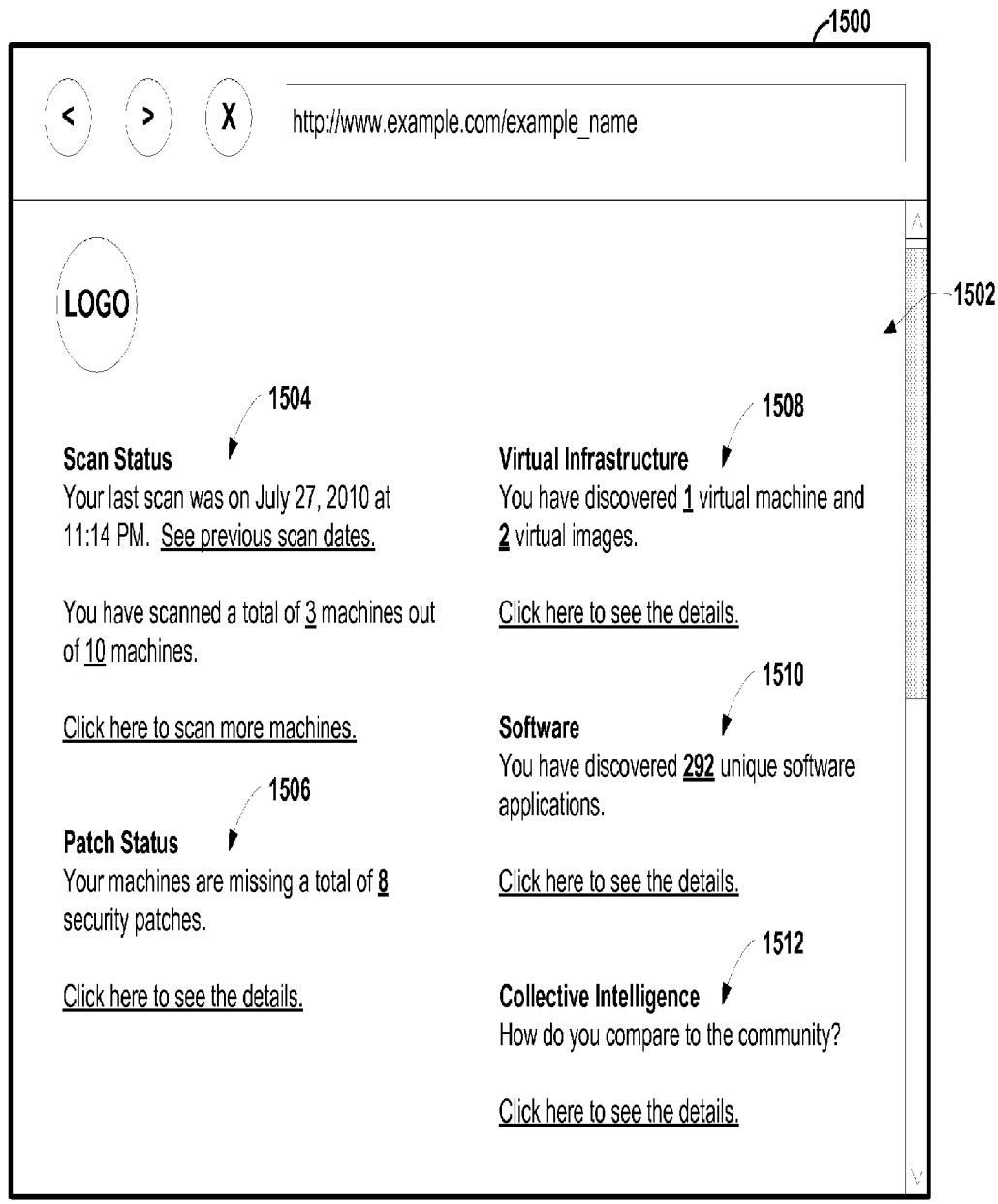
FIG. 15 illustrates a browser window and a webpage that is displayed by the web browser application.

FIG. 15 illustrates a browser window 1500 and a webpage 1502 that is displayed by the web browser application 502. The webpage 1502 provides a user interface for the asset inventory solution 804. In some embodiments, the webpage 1502 is displayed by the end user computing device 208 after the end user computing device 208 runs the asset inventory solution 804. The asset inventory solution 804 scans the computing systems 212 for software and hardware assets. In addition, the asset inventory solution 804 analyzes the discovered software and hardware assets of the computing systems 212. The asset inventory solution 804 can store data regarding the software and hardware assets in the user database 402.

As illustrated in the example of FIG. 15, the webpage 1502 includes scan status information 1504. The scan status information 1504 indicates when a last scan was performed and how many machines (i.e., computing systems) were scanned during the last scan. The scan status information 1504 also includes a link that enables a user to scan additional machines for software and hardware assets.

The webpage 1502 also includes patch status information 1506. The patch status information 1506 indicates how many security patches are missing from the scanned computing systems. In many cases, it is important for information technology professionals to ensure that all available security patches are installed on the computing systems 212. By determining the software assets of the computing systems 212 and comparing the software assets against a list of security patches, the asset inventory solution 804 can determine how many security patches are not installed on the computing systems 212. The patch status information 1506 also includes a link that enables a user to see additional details about installation statuses of security patches on the computing systems 212.

In addition, the webpage 1502 includes virtual infrastructure information 1508. The virtual infrastructure information 1508 indicates the number of virtual machines and the number of virtual images present on the computing systems 212. The virtual infrastructure information 1508 also includes a link that enables a user to see additional details about the virtual machines and the virtual images on the computing systems 212.

The webpage 1502 also include software information 1510. The software information indicates a number of unique software applications discovered on the computing systems 212. The software information 1510 also includes a link that enables a user to see additional details about the software applications installed on the computing systems 212.

Furthermore, the webpage 1502 includes a collective intelligence section 1512. The collective intelligence section 1512 contains a link that takes a user to a webpage containing information that shows how software and hardware assets of the computing systems 212 compare to the software and hardware assets of computing systems of other entities.

Figure 16:
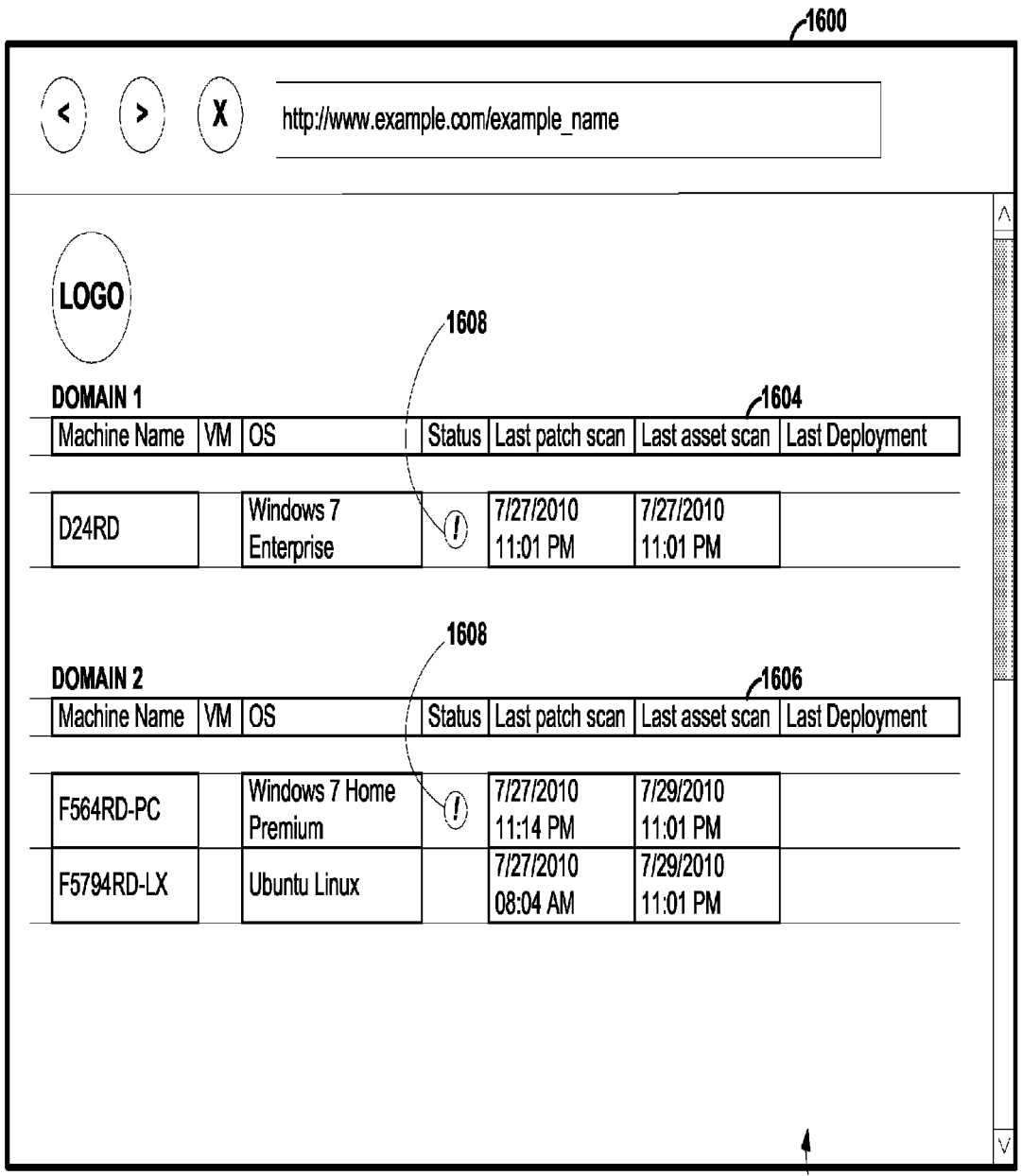
FIG. 16 illustrates a browser window and a webpage that is displayed by the web browser application.

FIG. 16 illustrates a browser window 1600 and a webpage 1602 that is displayed by the web browser application 502. The webpage 1602 presents a visualization of result data generated by performing an asset inventory. In some embodiments, one of the end user computing devices 208 displays the webpage 1602 after the end user computing device runs the asset inventory solution 804 discussed elsewhere in this patent document.

As illustrated in the example of FIG. 16, the webpage 1602 contains a table 1604 and a table 1606. The table 1604 contains information about computing devices in a domain named "Domain 1." The table 1606 contains information about computing devices in a domain named "Domain 2." The computing devices in "Domain 1" and "Domain 2" can be discovered when one of the end user computing devices 208 runs the asset inventory solution 804. In the example of FIG. 16, the table 1604 and the table 1606 specify machine names for the computing devices, whether the computing devices are virtual machines, operating systems for the computing devices, statuses for the computing devices, last patch scan dates for the computing devices, last asset inventory dates for the computing devices, and last deployment dates for the computing devices.

The statuses for the computing devices indicate whether the computing devices are properly configured. For example, the status for a given computing device may indicate that the given computing device is not properly configured when one or more important security patches are not installed on the given computing device. In the example of FIG. 16, the tables 1604 and 1606 include alert icons 1608 in the rows for computing devices that are not properly configured.

Figure 17:
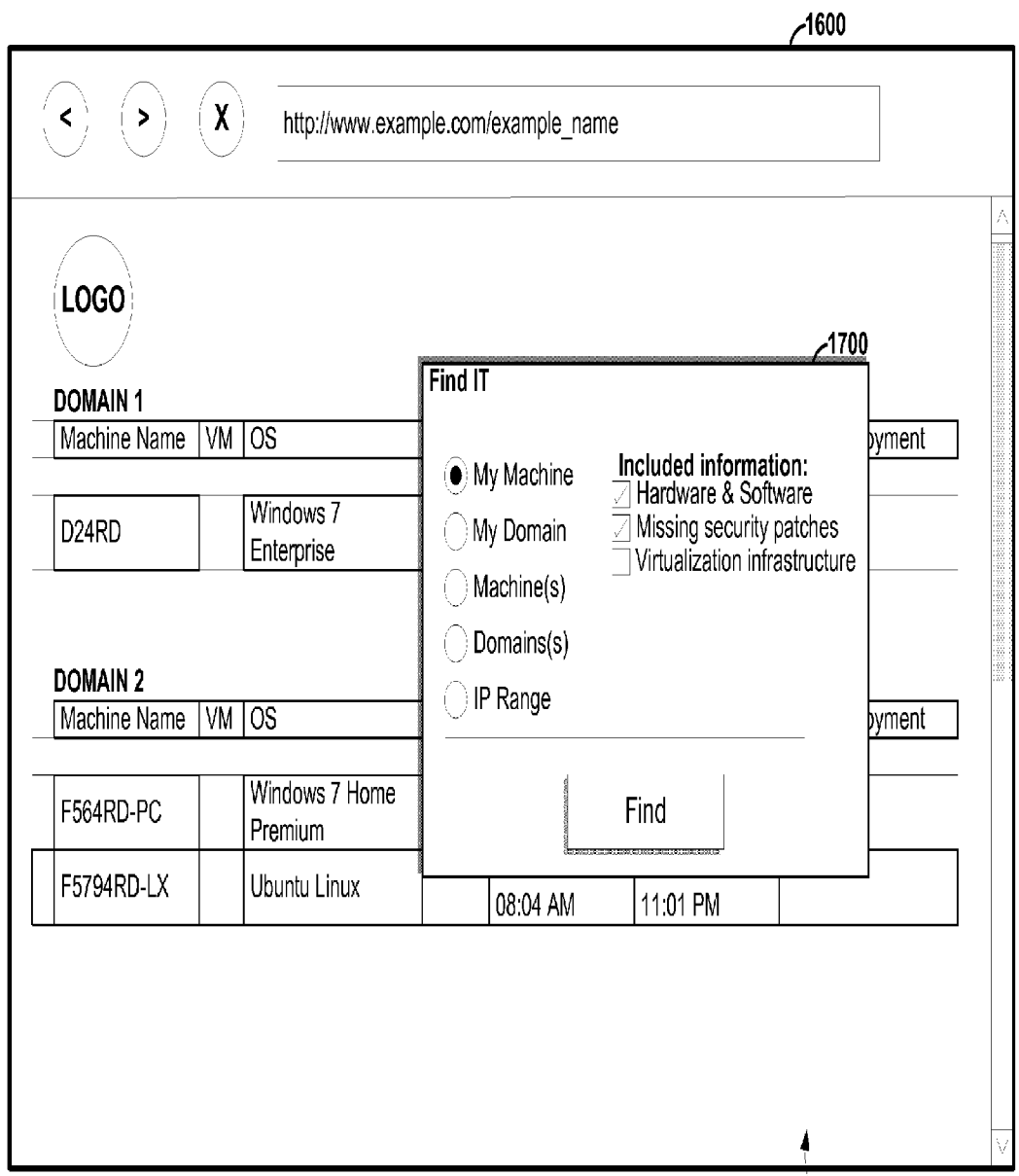
FIG. 17 illustrates a browser window and a webpage that is displayed by the web browser application.

FIG. 17 illustrates the browser window 1600 and the webpage 1600 that is displayed by the web browser application 502. In the example of FIG. 17, the webpage 1600 contains a solution scope user interface 1700. A user of the webpage 1600 can select the alert icons 1608. When the user selects one of the alert icons 1608, the solution scope user interface 1700 is displayed. The solution scope interface 1702 enables the user to select a scope in which to apply a fix. A fix is a series of steps to reconfigure a computing device. In addition, the solution scope interface 1702 allows the user to choose types of fixes to apply.

Figure 18:
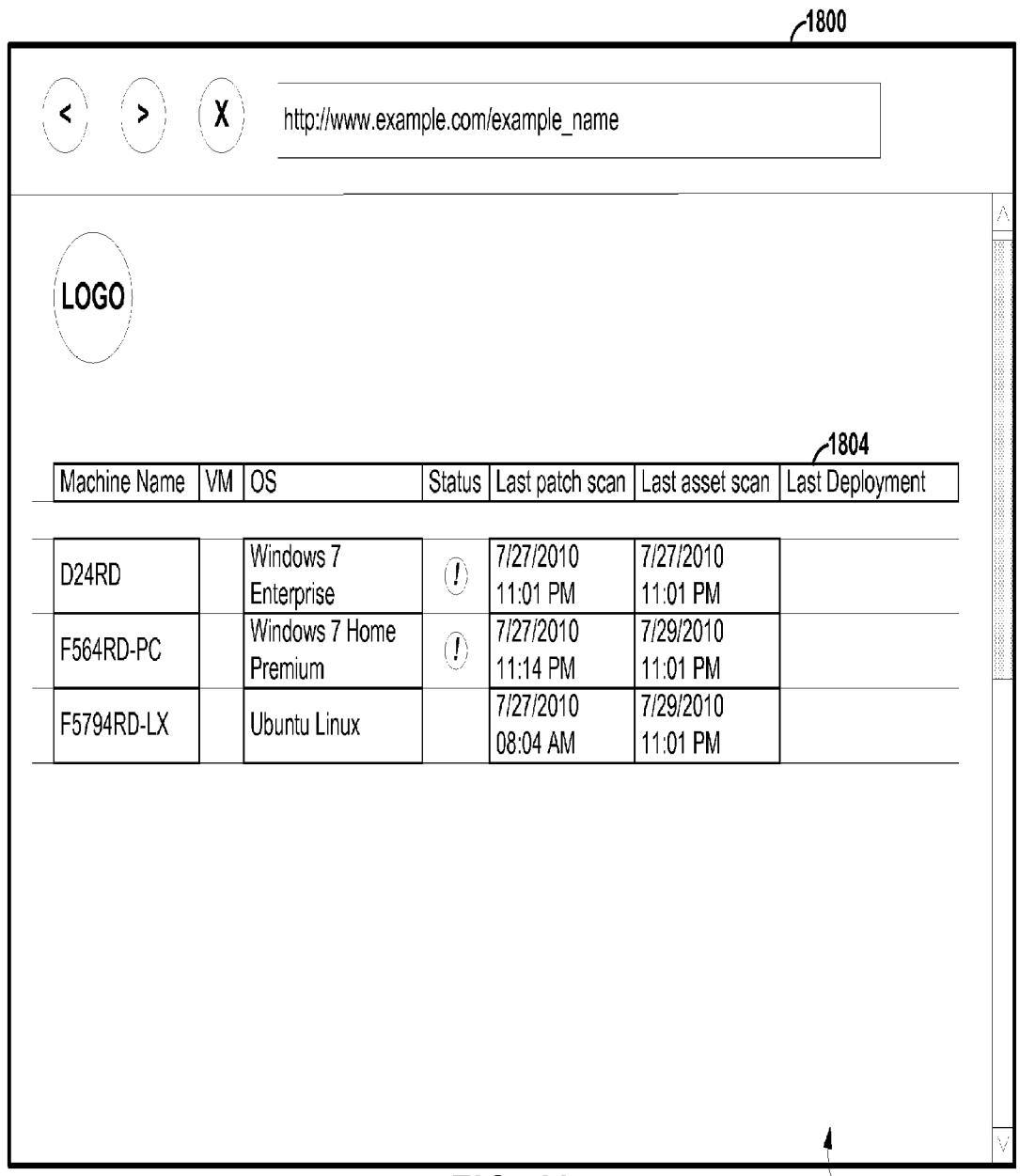
FIG. 18 illustrates a browser window and a webpage that is displayed by the web browser application.

FIG. 18 illustrates a browser window 1800 and a webpage 1802 that is displayed by the web browser application 502. The webpage 1802 provides another visualization of result data generated by running the asset inventory solution 804. As illustrated in the example of FIG. 18, the webpage 1802 contains a table 1804. The table 1804 contains information about computing devices discovered by performing an asset inventory on one or more networks. For example, the table 1804 can contain information about computing devices discovered by scanning a corporate network. Unlike the tables 1604 and 1606 in FIG. 16, the computing devices described in the table 1804 are not divided by domain.

FIG. 19 illustrates a browser window 1900 and a webpage 1902 that is displayed by the web browser application 502. The webpage 1902 presents a discovered software list 1904 and a missing security patch list 1906. The discovered software list 1904 contains a list of software discovered by running the asset inventory solution 804. The missing security patch list 1906 contains a list of security patches that are not installed on scanned computing devices. An active computing device can generate the missing security patch list 1906 by comparing a list of security patches installed on the scanned computing devices with one or more available security patch lists. The active computing device is one of the end user computing devices 208 or one of the hosting provider computing devices 210 where the asset inventory solution 804 runs. In various embodiments, the active computing device generates the available security patch lists in various ways. For example, the active computing device can generate the available security patch lists by automatically retrieving data from network services provided by publishers of the software discovered by the asset inventory solution 804. In another example, a user can provide the available security patch lists to the asset inventory solution 804.

Figure 20:
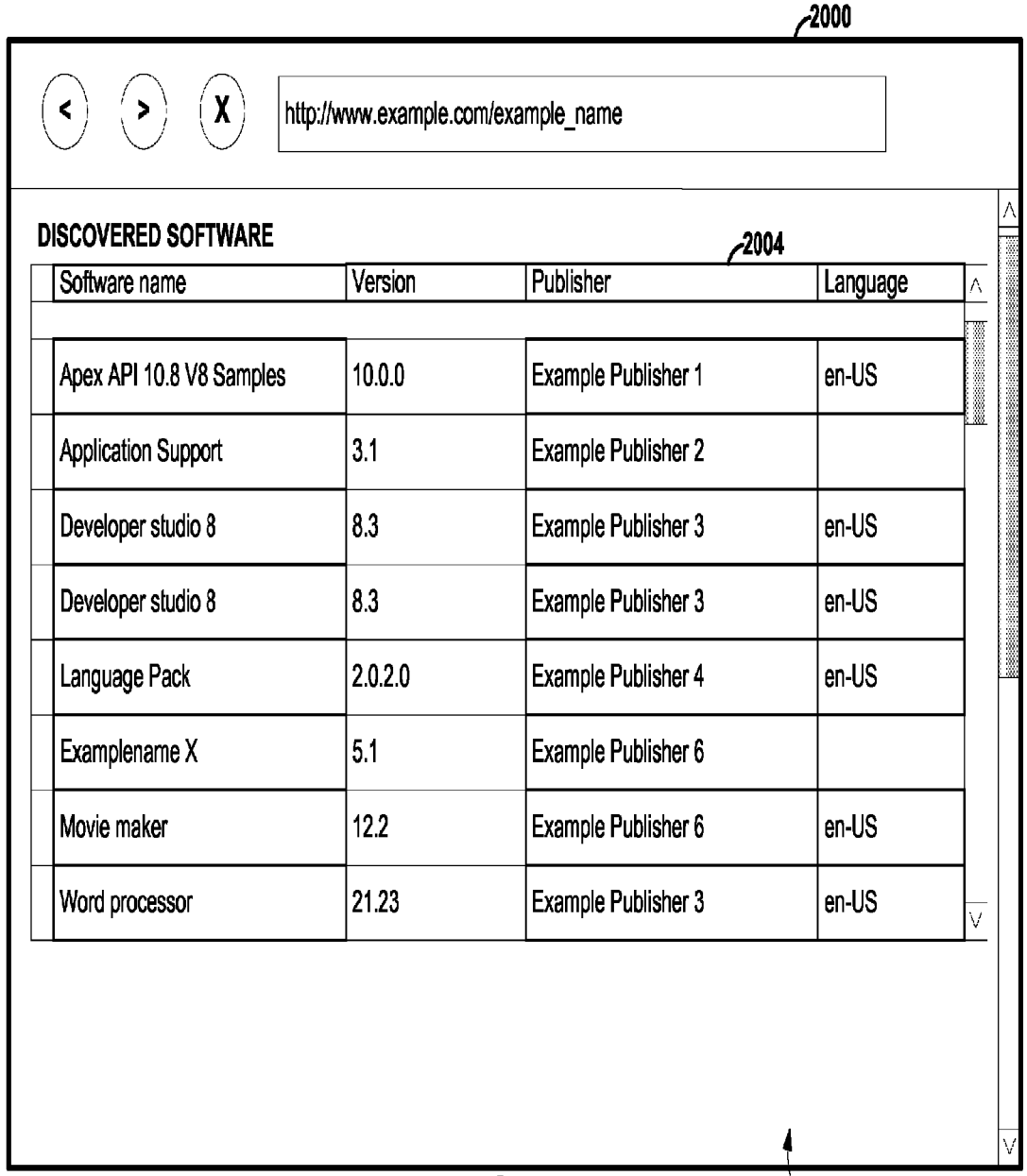
FIG. 20 illustrates a browser window and a webpage that is displayed by the web browser application.

FIG. 20 illustrates a browser window 2000 and a webpage 2002 that is displayed by the web browser application 502. The webpage 2002 presents a discovered software list 2004. The discovered software list 2004 contains data regarding software discovered by running the asset inventory solution 804. In the example of FIG. 20, the discovered software list 2004 specifies a software list, a version, a publisher, and a language for the discovered software.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A method for facilitating development of a system administration solution, the method comprising:
   selectively adding general-purpose components to a toolkit hosted by hosting provider computing devices, the general-purpose components being software components, the general-purpose components in the toolkit being available over a computer network to end user computing devices, the end user computing devices utilizing the general purpose components in the toolkit to provide system administration solutions, the system administration solutions being web applications hosted by the hosting provider computing devices, the system administration solutions providing an ability to perform administration tasks on on-premises computer systems;
   configuring the hosting provider computing devices such that the end user computing devices are able to utilize the general-purpose components in the toolkit on a Software-as-a-Service (SaaS) basis;
   including an agent in the toolkit, the agent being a component that operates on the end user computing devices with local administrator privileges, the agent running components in the toolkit that require local administrator privileges at the end user computing devices;
   receiving a request at the hosting provider computing devices from an end user computing device for the agent when it is determined by the end user computing device that the agent is not operational on the end user computing device; and
   receiving a request at the hosting provider computing devices from the end user computing device for a target component of the system administration solution that requires local administrator privileges at the end user computing device to operate properly.

2. The method of claim 1 further comprising: updating which general-purpose components are included in the toolkit.

3. The method of claim 2, wherein the end user computing devices check for current versions of the general-purpose components in the toolkit before using the general purpose components in the toolkit.

4. The method of claim 1 further comprising:
   providing a toolkit website over the computer network to independent software vendor (ISV) computing devices, the toolkit website comprising one or more web pages, the web pages comprising descriptions of the general-purpose components in the toolkit; and
   receiving the system administration solutions from one or more ISVs, the system administration solutions including one or more of the general-purpose components in the toolkit.

5. The method of claim 4, wherein the system administration solutions include special purpose components developed by the one or more ISVs, the special-purpose components hosted by the one or more hosting providers.

6. The method of claim 5, wherein the special-purpose components include web pages that include features that, when selected by the end users, cause the end user computing devices to utilize at least one of the general-purpose components in the toolkit.

7. The method of claim 1, wherein the system administration solutions include a system administration solution that enables one of the end users to administer a virtualization system.

8. The method of claim 1, wherein the general-purpose components include a component that uses collective intelligence (CI) data.

9. The method of claim 1, further comprising:
   validating a submitted general-purpose component developed by a third party; and
   adding the submitted general-purpose component to the toolkit when the submitted general purpose component is validated.

10. The method of claim 9, further comprising: arranging a compensation agreement with the third party for the submitted general-purpose component.

11. The method of claim 10, wherein the compensation agreement is at least partially based on a number of times the submitted general-purpose component is used in the system administration solutions.

12. The method of claim 1, wherein the general-purpose components in the toolkit include one or more scripts, one or more application programming interfaces (APIs), one or more compiled application programs, and one or more interface components.

13. The method of claim 1, wherein the system administration solutions include an asset inventory solution that, when run on the end user computing devices, inventories hardware and software assets of the on-premises computer systems.

14. A method of developing a system administration solution, the method comprising:
   accessing one or more web pages in a toolkit website, the one or more web pages in the toolkit website including descriptions of general-purpose components in a toolkit, the general-purpose components being available over a computer network on a Software-as-a-Service (SaaS) basis, wherein the general-purpose components in the toolkit include an agent, the agent being a component that operates on an end user computing device with local administrator privileges, the agent running components of the system administration solution that require local administrator privileges at the end user computing device;
   identifying needed general-purpose components from among the general-purpose components in the toolkit, the needed general-purpose components needed to develop a system administration solution for an end user, the end user having an on-premises computer system, the system administration solution being a web application that enables the end user to perform an administration task on the on-premises computer system;
   developing special-purpose components, the special-purpose components being needed to develop the system administration solution but not among the general-purpose components;
   storing the special-purpose components at a hosting provider computing device, the hosting provider computing device also hosting the general-purpose components;
   deploying the system administration solution;
   determining, by the end user computing device, whether the agent is operational on the end user computing device; and
   retrieving the agent from the hosting provider computing device when the agent is not operational on the end user computing device.

15. The method of claim 14,
the method further comprises:
   automatically installing the agent at the end user computing device;
   retrieving a target component of the system administration solution that requires local administrator privileges at the end user computing device to operate properly; and
   running the target component in the agent.

16. The method of claim 15, wherein the method further comprises:
   formatting, by the end user computing device, data generated by the target component in a format understandable by a service-oriented architecture (SOA) interface at the hosting provider computing device, thereby generating formatted data; and
   sending the formatted data to the SOA interface at the hosting provider computing device.

17. The method of claim 14, wherein developing the special-purpose components comprises: developing a special-purpose component that utilizes collective intelligence (CI) data.

18. The method of claim 14, wherein developing the special-purpose components comprises: developing a web page that includes a feature that, when selected by the end user, causes utilization of one of the general-purpose components in the toolkit.

19. The method of claim 14, wherein the system administration solution inventories hardware and software assets of the on-premises computer system.

20. A method for administering a computer system, the method comprising:
   retrieving, by an end user computing device operated by an end user, a web page in a system administration solution hosted by a hosting provider computing device, the system administration solution being a web application for performing an administration task on an on-premises computer system, a toolkit including general-purpose components available for use on a Software-as-a-Service (SaaS) basis, the system administration solution including at least one of the general-purpose component in the toolkit;
   causing, by the end user computing device, a display device to display the web page;
   receiving, by the end user computing device, component selection input indicating a feature of the web page selected by the end user, the feature associated with a target component of the system administration solution, the target component needing local administrator privileges at the end user computing device to operate properly;
   in response to receiving the component selection input, determining, by the end user computing device, whether an agent is operational at the end user computing device, the agent being a software process having local administrator privileges, the agent being one of the general-purpose components in the toolkit;
   in response to determining that the agent is not operational at the end user computing device:
      retrieving, by the end user computing device, data representing the agent from the hosting provider computing device; and
      starting the agent at the end user computing device;
   receiving, by the end user computing device, data representing the target component; and
   running, by the end user computing device, the target component in the agent.

21. The method of claim 20, wherein a toolkit manager validates and updates the general purpose components in the toolkit.

22. The method of claim 20, wherein the web page is a special-purpose component of the system administration solution.

23. The method of claim 20, wherein the on-premises computer system is a virtualization system.

24. The method of claim 20, wherein the on-premises computer system is a patch management system.

25. The method of claim 20, further comprising:
   determining, by the end user computing device, whether the target component is cached at the end user computing device; and
   when the target component is not cached at the end user computing device, sending, by the end user computing device, a request to the hosting provider computing device for the target component.

26. The method of claim 20, wherein the target component is an end-user developed component.

27. The method of claim 20, wherein the system administration solution inventories hardware and software assets of the on-premises computer system.

28. A computing device comprising:
   a processing unit; and
   a memory, the memory storing software instructions that, when executed by the processing unit, cause the computing device to:
      retrieve a web page in a system administration solution hosted by a hosting provider computing device, the system administration solution being a web application for performing an administration task on an on-premises computer system, a toolkit including general-purpose components that are available for use on a Software-as-a-Service basis, the system administration solution including at least one of the general-purpose components in the toolkit;
      cause a display device to display the web page;
      receive component selection input indicating a feature of the web page selected by a user of the computing device, the feature associated with a target component of the system administration solution, the target component needing local administrator privileges at the computing device to operate properly;
      in response to receiving the component selection input, determine whether an agent is operational at the computing device, the agent being a software process having local administrator privileges, the agent being one of the general-purpose components in the toolkit;
      in response to determining that the agent is not operational at the computing device:
         retrieve data representing the agent from the hosting provider computing device; and
         start the agent;
      receive data representing the target component; and
      run the target component in the agent.

29. A method for facilitating development of a system administration solution, the method comprising:
   adding components to a toolkit hosted by hosting provider computing devices, the components in the toolkit being available over a computer network to end user computing devices to perform administration tasks on on-premises computer systems;
   including in the toolkit an agent that operates on the end user computing devices with local administrator privileges;

receiving a request at the hosting provider computing devices from an end user computing device for the agent when it is determined by the end user computing device that the agent is not operational on the end user computing device; and receiving a request at the hosting provider computing devices from the end user computing device for a target component of the system administration solution that requires local administrator privileges at the end user computing device to operate properly.

30. The method of claim 29 further comprising: updating which components are included in the toolkit.

31. The method of claim 30, wherein the end user computing devices check for current versions of the components in the toolkit before using the components in the toolkit.

32. The method of claim 29 further comprising:

providing a toolkit website over the computer network to independent software vendor (ISV) computing devices, the toolkit website comprising one or more web pages, the web pages comprising descriptions of the components in the toolkit; and receiving the system administration solutions from one or more ISVs, the system administration solutions including one or more of the components in the toolkit.

* * * * *